United States Patent
Frenger et al.

(10) Patent No.: US 11,330,518 B2
(45) Date of Patent: May 10, 2022

(54) RADIO NETWORK NODE SLEEP OPERATION

(71) Applicant: Telefonaktiebolaget LM Ericsson (publ), Stockholm (SE)

(72) Inventors: Pål Frenger, Linköping (SE); Erik Eriksson, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 17/255,144

(22) PCT Filed: Jun. 29, 2018

(86) PCT No.: PCT/EP2018/067606
§ 371 (c)(1),
(2) Date: Dec. 22, 2020

(87) PCT Pub. No.: WO2020/001786
PCT Pub. Date: Jan. 2, 2020

(65) Prior Publication Data
US 2021/0266827 A1 Aug. 26, 2021

(51) Int. Cl.
*H04W 52/02* (2009.01)
*H04W 24/02* (2009.01)
(52) U.S. Cl.
CPC ....... *H04W 52/0206* (2013.01); *H04W 24/02* (2013.01)
(58) Field of Classification Search
CPC .... H04L 12/12; H04L 41/5019; H04W 24/02; H04W 52/0206
(Continued)

(56) References Cited

U.S. PATENT DOCUMENTS

| 2007/0259673 | A1 | 11/2007 | Willars et al. |
| 2016/0174149 | A1* | 6/2016 | Byun ............... H04W 52/0206 455/418 |
| 2019/0215766 | A1* | 7/2019 | Wu ...................... H04W 24/02 |

FOREIGN PATENT DOCUMENTS

| WO | 2008116502 A1 | 10/2008 |
| WO | 2010125982 A1 | 11/2010 |

(Continued)

OTHER PUBLICATIONS

Imran, Muhammad Ali, et al., "Energy efficiency analysis of the reference systems, areas of improvements and target breakdown", Energy Aware Radio and neTwork tecHnologies, INFSO-ICT-247733 Earth, Deliverable D2.3, Jan. 31, 2012, 1-68.

(Continued)

*Primary Examiner* — Gbemileke J Onamuti
(74) *Attorney, Agent, or Firm* — Christopher & Weisberg, P.A.

(57) ABSTRACT

The invention refers to a method for controlling sleep operation of a radio network node (12) that supports multiple sleep modes, the method comprising determining (110) which one or more of the supported sleep modes, if any, would prevent the radio network node (12) from being able to meet requirements on a quality of service, such as a maximum allowable data latency, to be provided by the radio network node (12); and preventing (120) the radio network node (12) from operating in any of the determined sleep modes; the invention further refers to a corresponding network node and a computer program.

16 Claims, 19 Drawing Sheets

(58) Field of Classification Search
USPC .......................................................... 370/311
See application file for complete search history.

(56) References Cited

FOREIGN PATENT DOCUMENTS

| | | |
|---|---|---|
| WO | 2014070785 A1 | 5/2014 |
| WO | 2018033659 A1 | 2/2018 |

OTHER PUBLICATIONS

Olsson, Magnus, et al., "Final Integrated Concept", Energy Aware Radio and neTwork tecHnologies, INFSO-ICT-247733 Earth, Deliverable D6.4, Jul. 16, 2012, 1-95.

* cited by examiner

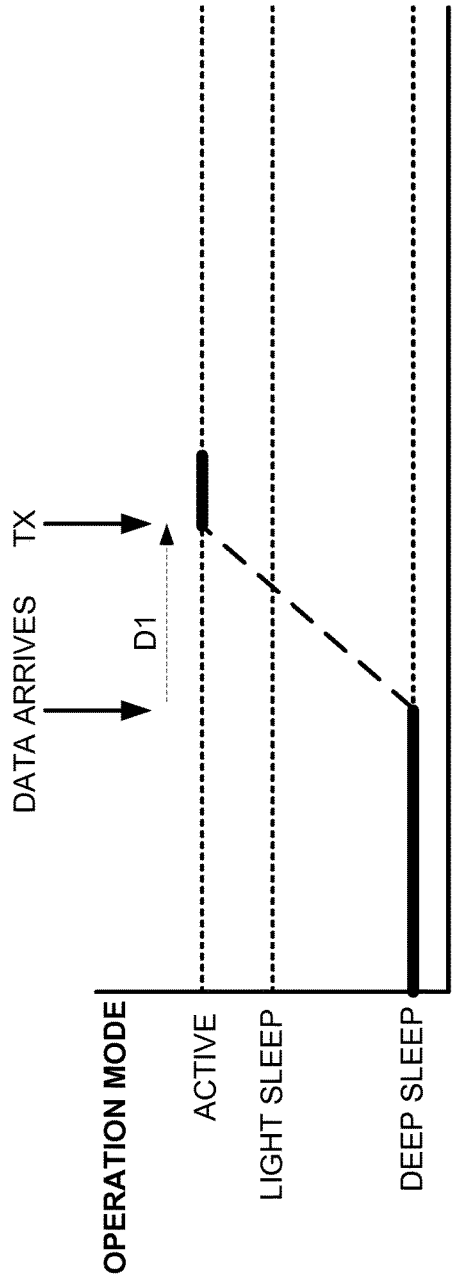
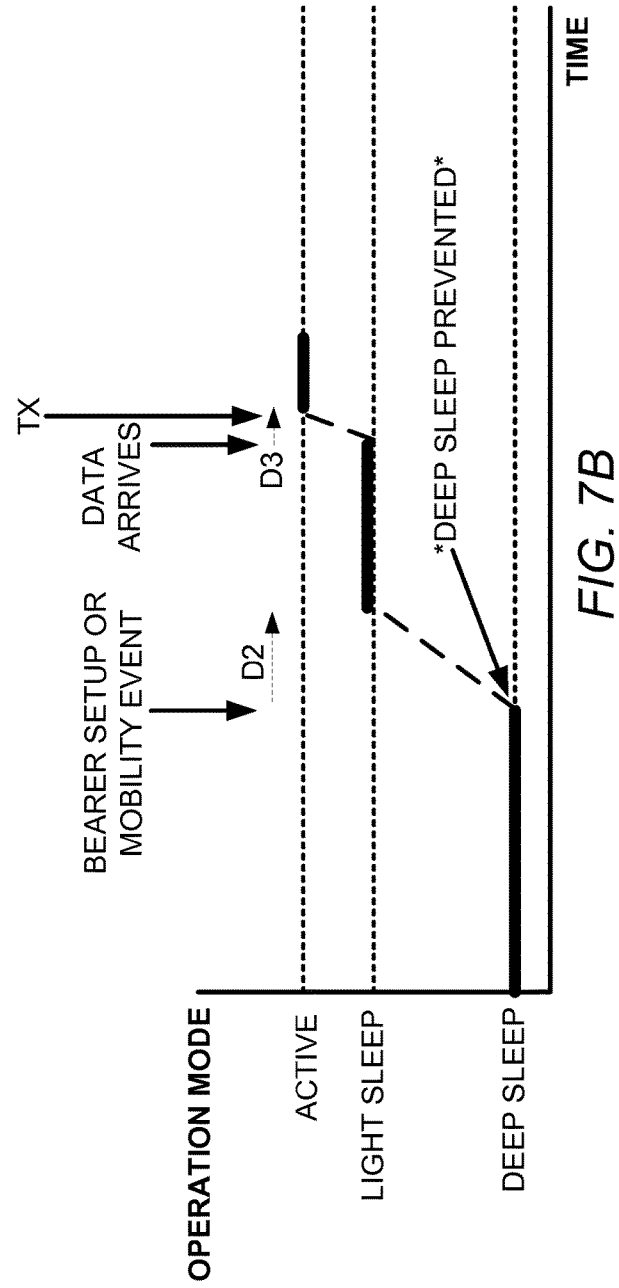

RADIO NETWORK NODE SLEEP OPERATION

TECHNICAL FIELD

The present application relates generally to a wireless communication system, and relates more particularly to sleep operation of a radio network node in such a wireless communication system.

BACKGROUND

Wireless communication system operators increasingly desire to reduce the power consumption of base stations in their systems. This in turn reduces ongoing system costs as well as environmental footprint.

One way to reduce base station power consumption overall is to configure a base station to sleep under certain conditions. When sleeping, a base station powers off at least some of its components (e.g., its transmitter circuitry and/or receiver circuitry). The conditions under which a base station sleeps may be chosen to generally scale the base station's power consumption with served traffic, e.g., so that the base station consumes little power when no traffic needs to be served. For example, a base station may be configured to sleep during certain times of the day or year when no traffic is expected (e.g., in the middle of the night). Or a base station may be configured to sleep after the base station has been inactive in terms of transmitting and/or receiving for a certain period of time.

Configuring a base station with the most appropriate conditions for sleep nonetheless proves challenging, especially in a way that provides the base station with different levels or modes of sleep.

SUMMARY

Some embodiments herein prevent a radio network node from operating in a supported sleep mode that would prevent the radio network node from being able to meet requirements imposed on the radio network node. One or more embodiments, for instance, prevent the radio network node from operating in a supported sleep mode that would prevent the radio network node from being able to meet requirements on a quality of service to be provided by the radio network node. For example, the radio network node may be prevented from operating in any sleep mode that the radio network node would not be able to awaken from in time to meet requirements on a quality of service to be provided by the radio network node. With a mechanism to ensure sleep modes do not cause unacceptable quality of service and correspondingly degraded user experience, no matter how long it takes to awaken from those sleep modes, some embodiments advantageously enable use of sleep modes that aggressively provide deep sleep and correspondingly low power consumption.

Alternatively or additionally, some embodiments herein control a radio network node to exit a sleep mode (e.g., a deep sleep mode) when a bearer is set up at the radio network node. Conditioning this sleep mode transition on bearer setup, which occurs before traffic arrives for transmission over the bearer, may advantageously prevent or mitigate unacceptable service delay.

More particularly, embodiments herein include a method for controlling sleep operation of a radio network node that supports multiple sleep modes. The method comprises determining which one or more sleep modes, if any, would prevent the radio network node from being able to meet requirements on a quality of service to be provided by the radio network node. The method also comprises preventing the radio network node from operating in any of the determined sleep modes.

In some embodiments, this determining comprises determining which one or more of the supported sleep modes, if any, the radio network node would not be able to awaken from in time to meet the requirements on a quality of service to be provided by the radio network node.

In some embodiments, the requirements on a quality of service to be provided by the radio network node comprise a maximum allowable data latency.

In some embodiments, the method comprises preventing the radio network node from operating in any of the determined sleep modes while the requirements are imposed on the radio network node and allowing the radio network node to operate in at least some of the determined sleep modes while the requirements are not imposed on the radio network node.

In some embodiments, said determining and preventing are performed responsive to a change in the requirements on the quality of service to be provided by the radio network node. In one or more embodiments, for example, said change comprises or occurs with a change in which bearers, if any, are set up at the radio network node. Alternatively or additionally, in some embodiments said change comprises or occurs with mobility events associated with wireless devices served by the radio network node.

In some embodiments, the requirements are associated with one or more bearers and are imposed on the radio network node while the one or more bearers are set up and/or active at the radio network node.

In some embodiments, determining which one or more sleep modes, if any, would prevent the radio network node from being able to meet requirements on a quality of service to be provided by the radio network node comprises determining which one or more sleep modes, if any, are mapped to one or more quality of service, QoS, class identifier of one or more bearers set up at the radio network node as being incompatible with those one or more QoS class identifiers. In this case, preventing the radio network node from operating in any of the determined sleep modes may comprise, while the one or more bearers are set up at the radio network node, preventing the radio network node from operating in any of the determined sleep modes.

In some embodiments, this determining comprises determining which one or more of the supported sleep modes, if any, the radio network node would not be able to awaken from in time to meet the requirements on a quality of service to be provided by the radio network node. In one such embodiment, for at least one sleep mode, the radio network node is able to awaken from that sleep mode in time to meet the requirements, based on another radio network node temporarily meeting the requirements on behalf of the radio network node while the radio network node awakens from the sleep mode.

In some embodiments, the method further comprises transmitting or receiving a handover request message that requests handover of a wireless device to or from the radio network node and that indicates requirements on a quality of service associated with serving the wireless device.

Embodiments herein also include a method for controlling sleep operation of a radio network node. The method comprises, while the radio network node is in a sleep mode, monitoring for set up of a bearer at the radio network node. The method also comprises, responsive to detecting set up of a bearer according to said monitoring, controlling the radio network node to exit the sleep mode.

In some embodiments, the sleep mode is a deep sleep mode, wherein the radio network node is in a deeper sleep in the deep sleep mode than in a light sleep mode. In one or more of these embodiments, the method comprises, responsive to detecting set up of a bearer according to said monitoring, controlling the radio network node to exit the deep sleep mode and to start to transition to the light sleep mode or an active mode before traffic arrives in a transmit queue of the radio network node for transmission over the bearer In some embodiments, the method further comprises controlling the radio network node to enter the sleep mode responsive to detecting that no bearer is set up at the radio network node.

Embodiments herein also include corresponding apparatus, computer programs, and carriers (e.g., non-transitory computer-readable mediums). For example, embodiments herein include a network node (e.g., configured to implement a sleep controller) for controlling sleep operation of a radio network node that supports multiple sleep modes. The network node (e.g., comprising radio circuitry and processing circuitry) is configured to determine which sleep modes, if any, would prevent the radio network node from being able to meet requirements on a quality of service to be provided by the radio network node, and to prevent the radio network node from operating in any of the determined sleep modes.

As another example, embodiments also include a network node (e.g., configured to implement a sleep controller) for controlling sleep operation of a radio network node. The network node (e.g., comprising radio circuitry and processing circuitry) is configured to, while the radio network node is in a sleep mode, monitor for set up of a bearer at the radio network node and, responsive to detecting set up of a bearer according to said monitoring, exit the sleep mode.

BRIEF DESCRIPTION OF THE DRAWINGS

FIGS. 7A-7B are timing diagrams of sleep mode operation with and without sleep mode prevention, respectively, according to some embodiments.

DETAILED DESCRIPTION

Figure 1:
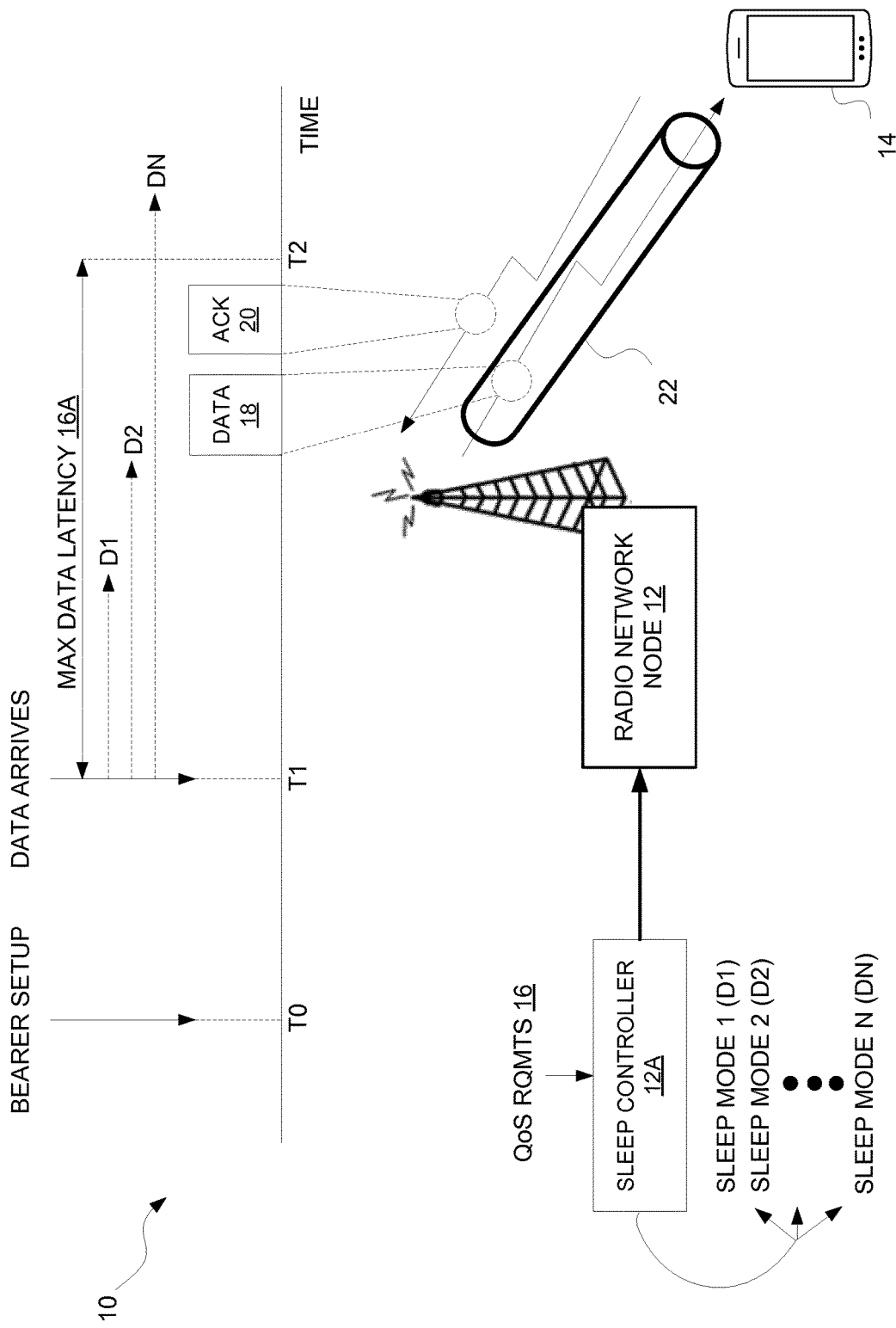
FIG. 1 is a block diagram of a wireless communication system that includes a sleep controller according to some embodiments.

FIG. 1 shows a wireless communication system 10 according to some embodiments. The system 10 includes a radio network node 12 (e.g., a base station) in a radio access network portion of the system 10. The system 10 as shown also includes a wireless device 14 configured to wirelessly communicate with the radio network node 12, e.g., for connecting to a core network portion (not shown) of the system 10.

The radio network node 12 supports operating in one or more sleep modes 1, 2, . . . N. In each sleep mode, the radio network node 12 may deactivate or otherwise modify operation of at least some of its components or circuitry, e.g., that are associated with a certain function such as transmission or reception. The sleep modes 1, 2, . . . N may for instance constitute transmission circuitry sleep modes that provide different degrees of sleep for transmission circuitry of the radio network node 12. Alternatively, the sleep modes 1, 2, . . . N may be reception circuitry sleep modes that provide different degrees of sleep for reception circuitry of the radio network node 12. No matter the type of sleep modes, then, different respective sleep modes may be associated with different degrees of sleep and thereby power conservation. For example, in different sleep modes, the radio network node 12 may deactivate a different number of transmitter/receiver components and/or may deactivate transmitter/receiver components to different degrees.

Each sleep mode 1, 2, . . . N requires a respective delay 1, 2, . . . N in time for the radio network node 12 to awaken from that sleep mode. As shown, for example, the radio network node 12 requires a delay D1 to awaken from sleep mode 1, a delay D2 to awaken from sleep mode 2, etc. Generally, a relatively "deeper" sleep mode in which the radio network node 12 deactivates a greater number of components or deactivates components to a greater degree than a relatively "lighter" sleep mode requires a relatively longer delay to awaken from, e.g., since more components have to be re-activated. In FIG. 1, for instance, sleep mode 1 is a lighter sleep mode than sleep mode 2 and requires a shorter delay D1 to awaken from than the delay D2 that the radio network node takes to awaken from sleep mode 2. Conversely, sleep mode N is a deeper sleep mode than sleep mode 2 and requires a longer delay DN to awaken from than the delay D2 that the radio network node takes to awaken from sleep mode 2.

FIG. 1 shows a sleep controller 12A that controls in which sleep mode the radio network node 12 operates. The sleep controller 12A in some embodiments prevents the radio network node 12 from operating in any supported sleep mode that would prevent the radio network node 12 from being able to meet certain requirements imposed on the radio network node 12 (e.g., requirements on a quality of service, QoS, to be provided by the radio network node 12). According to some embodiments, for instance, the sleep controller 12A takes the delays required for the radio network node 12 to awaken from supported sleep mode(s) (e.g., delays D1, D2, . . . DN) into account in order to control in which sleep mode the radio network node 12 operates. The sleep controller 12A in one or more embodiments, for example, prevents the radio network node 12 from operating in a supported sleep mode that the radio network node 12 would not be able to awaken from in time to meet certain requirements (e.g., requirements on a QoS to be provided by the radio network node 12). That is, even though the radio network node 12 may actually support operating in a given sleep mode, the sleep controller 12A artificially restricts the radio network node 12 from operating in that sleep mode in order to ensure that the delay in awakening from the sleep mode will not jeopardize certain requirements that the radio network node 12 must meet. The sleep controller 12A may for instance restrict in which sleep mode the radio network node 12 may enter or stay in. This restriction may nonetheless be temporary, e.g., so as to be limited to the time period during which the requirements are imposed on the radio network node 12. The sleep controller 12A may be implemented by the radio network node 12 itself, such that the restriction is self-imposed, or in other embodiments may be implemented by another network node in the system 10 (e.g., in the radio access network and/or in a central sleep control node).

FIG. 1 illustrates an example of this with regard to requirements on a quality of service (QoS) to be provided by the radio network node 12. The sleep controller 12A receives or otherwise determines requirements 16 on a QoS to be provided by the radio network node 12. The sleep controller 12A takes the QoS requirements 16 and the delays D1, D2, . . . DN required to awaken from supported sleep modes 1, 2, . . . N into account in order to control in which sleep mode the radio network node 12 operates. In particular, the sleep controller 12A prevents the radio network node 12 from operating in (e.g., entering or staying in) a supported sleep mode that the radio network node 12 would not be able to awaken from in time to meet the QoS requirements 16. A sleep mode that would prevent the radio network node 12 from meeting the QoS requirements 16 may be deemed as "incompatible" with the QoS requirements 16 and thereby avoided by the radio network node 12.

Consider for instance an example where the QoS requirements 16 comprises or includes a maximum allowable data latency 16A; that is, requirements that the radio network node 12 must provide a QoS to a wireless device 14 with a (user plane) data latency (e.g., packet delay) that does not exceed a maximum threshold (e.g., 50 ms or 100 ms). As shown, such requirements on maximum data latency 16A means that, if data 18 intended for a wireless device 14 arrives (e.g., within a transmit buffer and/or at a certain protocol layer) at the radio network node 12 at time T1, the radio network node 12 must transmit the data 18 and receive a positive acknowledgement (ACK) 20 of that data 18 from the wireless device 14 by time T2 (where the maximum data latency 16A requirement is a duration equal to T2 minus T1).

The sleep controller 12A takes this maximum data latency 16A and the delays D1, D2, . . . DN required to awaken from supported sleep modes 1, 2, . . . N into account in order to control in which sleep mode the radio network node 12 operates. In particular, the sleep controller 12A prevents the radio network node 12 from operating in a supported sleep mode that the radio network node 12 would not be able to awaken from in time to meet the requirements on maximum data latency 16A, i.e., a sleep mode that is incompatible with the maximum data latency 16A.

As shown, for instance, if the radio network node 12 was in sleep mode N when data 18 arrives at time T1, the radio network node 12 would not be able to awaken from that sleep mode N until after time T2 due to the delay DN required to awaken from sleep mode N. This would mean that the radio network node 12 was not able to meet the required maximum data latency 16A for data 18, i.e., that sleep mode N is incompatible with the required maximum data latency 16A. However, if the radio network node 12 was in either sleep mode 1 or 2 when data arrives at time T1, the radio network node 12 would be able to awaken in time to transmit the data 18 and receive a positive acknowledgement before time T2. Accordingly, the sleep controller 12A in this case may prevent the radio network node 12 from entering or staying in sleep mode N, but allow the radio network node 12 to enter or stay in either sleep mode 1 or 2.

The sleep controller 12A in some embodiments actively restricts sleep mode operation of the radio network node 12 in this way while the QoS requirements 16 are imposed on the radio network node 12. That is, the sleep controller 12A prevents the radio network node 12 from operating in any incompatible sleep modes while the QoS requirements 16 are imposed on the radio network node 12, but may allow the radio network node 12 to operate in at least some of the incompatible sleep modes while the QoS requirements 16 are not imposed on the radio network node 12.

The sleep controller 12A may nonetheless update its restriction on sleep mode operation as needed to account for changes in the requirements imposed on the radio network node 12. For example, as the requirements 16 on the QoS to be provided by the radio network node 12 change, the sleep controller 12A may update which sleep modes, if any, it prevents the radio network node 12 from operating in. In one or more embodiments, for instance, where the QoS requirements 16 are associated with one or more bearers that are set up at the radio network node 12, the sleep controller 12A may update which sleep modes it prevents the radio network node 12 from operating in responsive to a change in which bearers (if any) are set up at the radio network node 12.

More particularly, the requirements 16 on the QoS to be provided by the radio network node 12 are associated with one or more bearers 22 in some embodiments. A bearer 22 in this regard is a logical path to or from a wireless device 14 that terminates at or traverses the radio network node 12 and that is associated with certain QoS requirements of traffic to be transported on the bearer 22. The QoS requirements may be specified in terms of a set of QoS parameters concerning requirements on bit rate, packet delay, packet loss, bit error rate, scheduling policy, etc. In this way, different types of bearers enable differentiated treatment of traffic based on the QoS requirements of the traffic.

Figure 2:
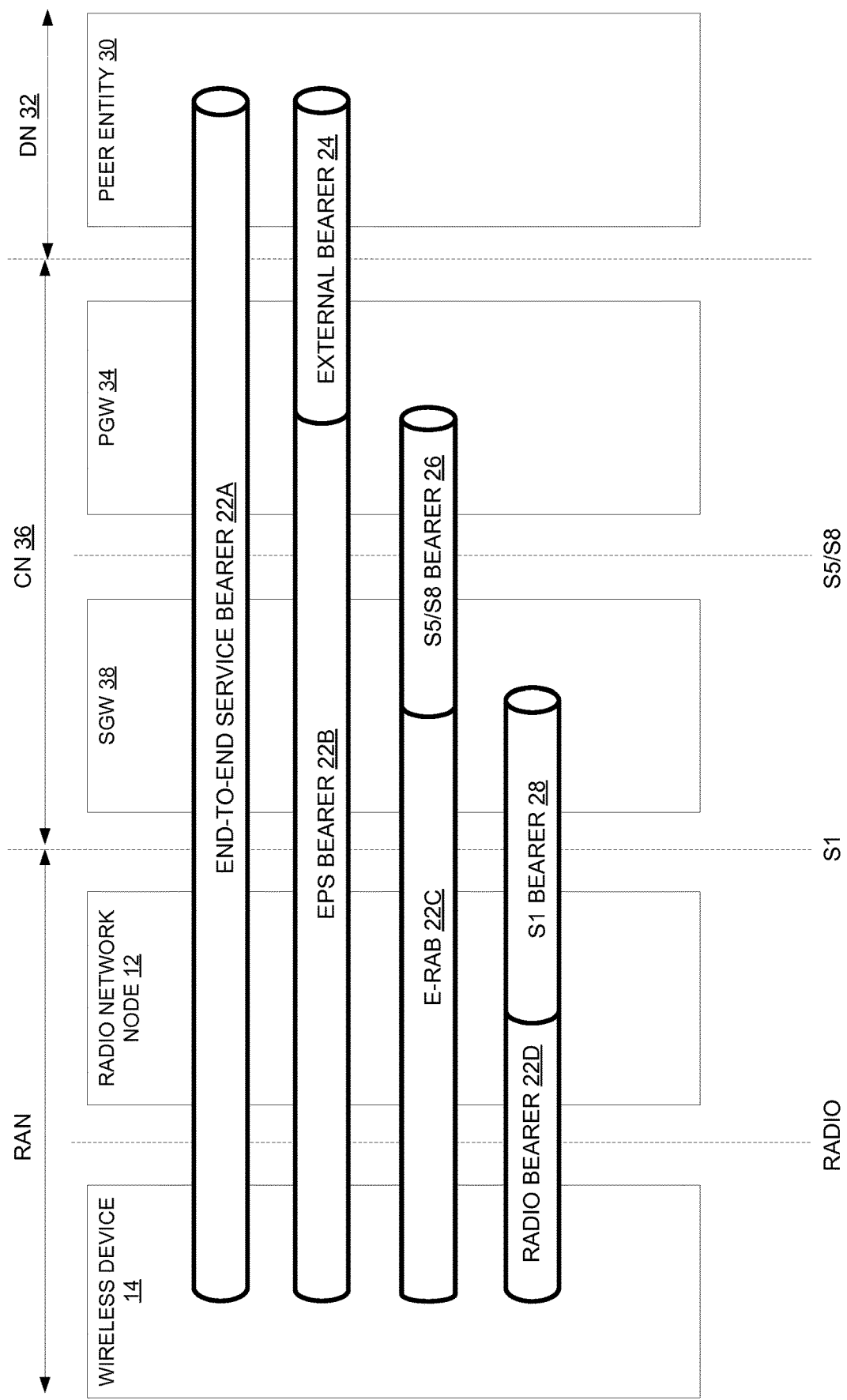
FIG. 2 is block diagram of bearers in a wireless communication system according to some embodiments.

FIG. 2 illustrates different embodiments of a bearer 22 in a context where the system 10 is a Long Term Evolution (LTE) system or other system that uses LTE-based interfaces. As shown, an end-to-end service bearer 22A is established between a wireless device 14 and a peer entity 30 in a data network (DN) 32 such as the Internet. The end-to-end service bearer 22A is realized by an Evolved Packet System (EPS) bearer 22B and an external bearer 24. An EPS bearer 22B is a virtual connection between the wireless device 14 and a packet data network gateway (PGW) 34 in the core network 36. An EPS bearer 22B uniquely identifies traffic flows that receive common QoS treatment between the wireless device 14 and the PGW 34. For example, an EPS bearer 22B has a QoS class identifier (QCI) that identifies a QoS class of the EPS bearer 22B, with different QoS classes having different QoS requirements (e.g., in terms of scheduling priority, packet delay budget, packet error loss rate, etc).

The EPS bearer 22B is in turn realized as a combination of an E-UTRAN radio access bearer (E-RAB) 22C and an S5/S8 bearer 26. The S5/S8 bearer 28 transports the packets of an EPS bearer 22B between the PWG 34 and a serving gateway (SGW) 38 in the CN 36. The E-RAB 22C bearer is correspondingly realized as a radio bearer 22D and an S1 bearer 28. The S1 bearer transports packets of an EPS bearer 22B between the radio network node 12 and the SGW 38. A radio bearer 22D transports the packets of an EPS bearer between the wireless device 14 and the radio network node 12. The radio bearer 22D may be a data radio bearer (DRB) or a signalling radio bearer (SRB).

In this context of FIG. 2, a bearer 22 associated with the requirements 16 on the QoS to be provided by the radio network node 12 may be a radio bearer 22D, an E-RAB 22C, an EPS bearer 22B or an end-to-end service bearer 22A.

Figure 3:
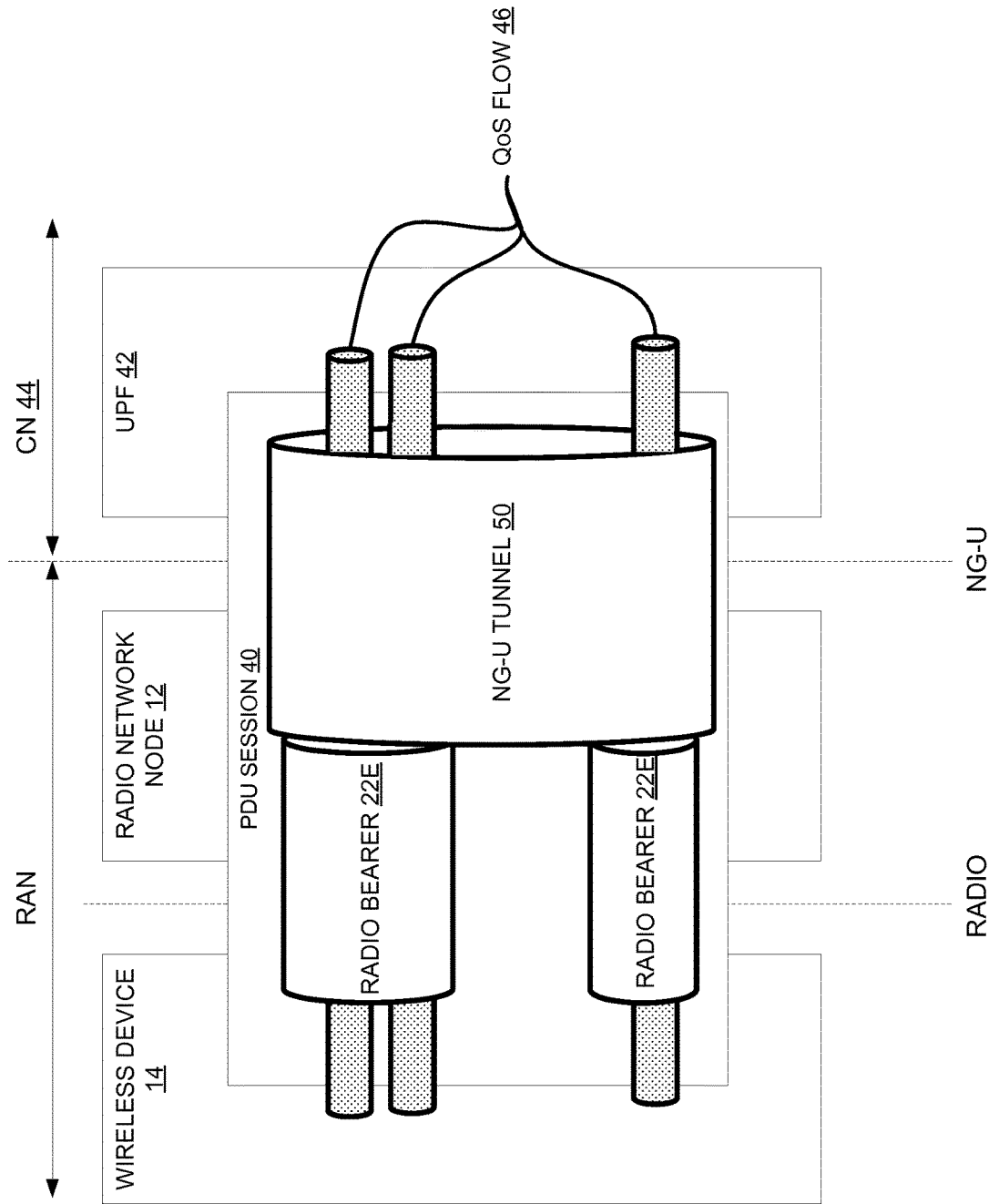
FIG. 3 is a block diagram of bearers and QoS flows in a wireless communication system according to other embodiments.

FIG. 3 illustrates still other embodiments of a bearer 22 in a context where the system 10 is a 5G or New Radio (NR) system. As shown, a protocol data unit (PDU) session 40 provides PDU connectivity service between a wireless device 14 and a user plane function (UPF) 42 of a CN 44. A QoS flow 46 is the finest granularity of QoS differentiation in a PDU session 40. User plane traffic with the same QoS flow 46 within a PDU session 40 receives the same traffic forwarding treatment.

One or more radio bearers 48 are established per PDU session 40 for transport of the traffic of one or more QoS flows between the wireless device 14 and the radio network node 12. An NG-U tunnel 50 is established between the radio network node 12 and the UPF 42. The radio network node 12 maps packets belonging to different PDU sessions for different radio bearers and/or maps multiple QoS flows to a single radio bearer.

In this context of FIG. 3, a bearer 22 associated with the requirements 16 on the QoS to be provided by the radio network node 12 may be a radio bearer 22E.

No matter the particular nature of a bearer 22, though, the setting up of a bearer 22 at the radio network node 12 is what in some embodiments imposes the associated QoS requirements on the radio network node 12. That is, when a bearer 22 is set up at the radio network node 12, it is then that the radio network node 12 must meet the QoS requirements associated with that bearer 22. And while the bearer 22 remains set up at the radio network node 12, the QoS requirements associated with that bearer 22 continue to be imposed on the radio network node 12. But, before a bearer 22 is set up or after the bearer 22 is released, the radio network node 12 is relieved from having to meet the QoS requirements associated with that bearer 22. Accordingly, in some embodiments, the sleep controller 12A determines which sleep modes (if any) to prevent the radio network node 12 from operating in when a bearer 22 is set up or released at the radio network node 12.

As shown in FIG. 1, for example, a bearer 22 is set up at the radio network node 12 at time T0. Responsive to the set up of this bearer 22 at time T0, the sleep controller 12A prevents the radio network node 12 from operating in any sleep modes that are incompatible with the QoS requirements 16 of the bearer 22, e.g., from which the radio network node 12 would not be able to awaken in time to meet a maximum allowable data latency required for the bearer 22. Ignoring processing delays, therefore, this sleep mode restriction may be enforced as of time T0, in advance of data arriving in a buffer of the radio network node 12 at time T1. Indeed, enforcement of the sleep mode restriction as of bearer setup proactively prepares the radio network node 12 to receive data at any time for transport over the bearer 22 (i.e., any time after $T_O$) and still abide by the QoS requirements associated with the bearer 22. That is, the sleep controller 12A may prevent unacceptable QoS by making the radio network node 12 come out of a (deep) sleep mode earlier than it would have if it had waited to emerge from that sleep mode until arrival of the data. In some embodiments, the sleep controller 12A correspondingly lifts the sleep mode restriction when the bearer 22 is released and/or modifies the sleep mode restriction when the bearer 22 is reconfigured.

Figure 4:
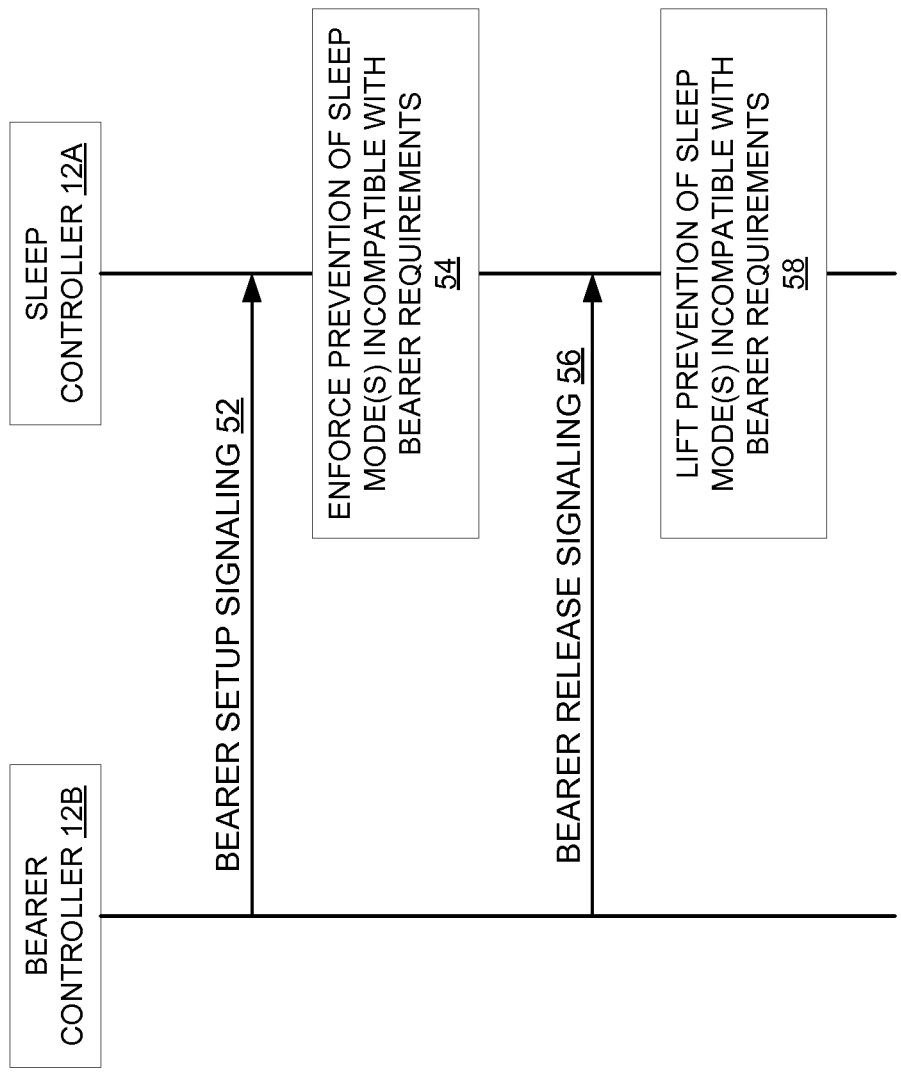
FIG. 4 is a call flow diagram between a bearer controller and a sleep controller according to some embodiments.

FIG. 4 illustrates a call flow diagram according to these and other embodiments. As shown, a bearer controller 12B in the radio access network (e.g., in the radio network node 12 or another radio network node) controls setup and release of a bearer 22 at the radio network node 12. The bearer controller 12B may be for instance a radio resource control (RRC) entity at the radio network node 12.

In FIG. 4, the bearer controller 12B sends signalling 52 to the sleep controller 12A including information about the set up of a bearer 22 at the radio network node 12. The information may indicate for instance a type or identity of the bearer 22, QoS requirements 16 associated with the bearer 22 (e.g., in terms of a QoS class identifier), or the like. Based on this information, the sleep controller 12A determines which sleep modes, if any, are incompatible with QoS requirements 16 of the bearer 22, i.e., since the radio network node 12 would not be able to awaken from the sleep mode to meet those requirements.

For example, in some embodiments, the sleep controller 12A actually determines incompatible sleep modes as a function of the delays D1, D2, ... DN required to awaken from supported sleep modes 1, 2, ... N and the maximum allowable data latency 16A associated with the bearer 22. For instance, the sleep controller 12A may deem incompatible any sleep mode with a delay within a certain margin of the maximum allowable data latency 16A.

In other embodiments, though, the sleep controller 16A maintains a (predefined) mapping between different types, identities, or QoS class identifiers of bearers and supported sleep modes that are incompatible (or compatible) with those types, identities, or QoS class identifiers. In this case, then, the mapping may effectively and implicitly account for the delays required to awaken from supported sleep modes (or any other characteristics of the sleep modes that would prevent the radio network node 12 from being able to meet QoS requirements). The sleep controller 16A determines which sleep modes, if any, are mapped to the type, identity, or QoS class identifier of the bearer 22 that is set up in order to determine which sleep modes, if any, to prevent operation within.

Figure 5:
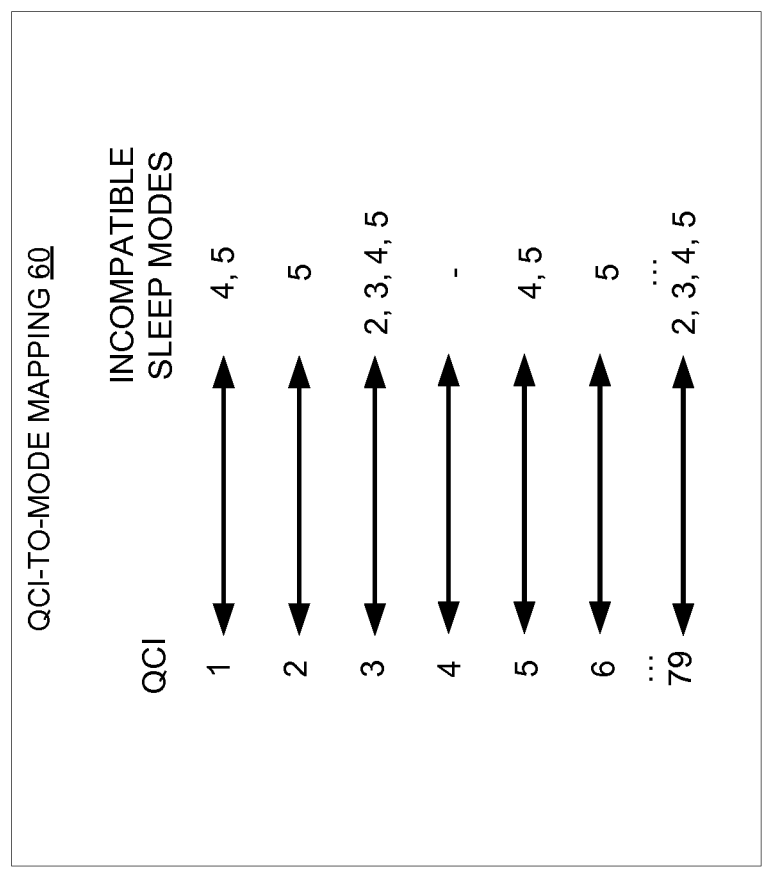
FIG. 5 is a block diagram of a mapping between QoS class identifiers and sleeping modes according to some embodiments.

FIG. 5 illustrates a simple example of a QCI-to-mode mapping 60 usable according to some of these embodiments. As shown, the mapping 60 indicates that sleep modes 4 and 5 are incompatible with a QoS class identifier (QCI) of 1, that sleep mode 5 is incompatible with a QCI of 2, that sleep modes 2, 3, 4, and 5 are incompatible with a QCI of 3, that no sleep modes are incompatible with a QCI of 4, and so on. In other embodiments not shown, the mapping may alternatively or additionally indicate sleep modes that are compatible with respective QCIs.

No matter the particular way the sleep controller 12A determines which sleep modes to prevent operation in, the sleep controller 12A enforces prevention of the radio network node 12 operating in any of the determined sleep modes (Block 54). The sleep controller 12A in this regard may exclude the determined sleep modes, if any, from a set of allowable sleep modes and control the radio network node 12 to limit its operation to one of the allowable sleep modes. In fact, in some embodiments, the sleep controller 12A may control the radio network node 12 to exit from any incompatible sleep mode and/or enter a compatible sleep mode.

When the bearer 22 is released, though, the bearer controller 12B similarly sends signalling 56 to the sleep controller 12A including information about the release of the bearer 22 at the radio network node 12. The information may again indicate for instance a type or identity of the bearer 22, QoS requirements 16 associated with the bearer 22 (e.g., in terms of a QoS class identifier), or the like. Based on this information, the sleep controller 12A may lift the restriction/prevention of sleep modes that were incompatible with QoS requirements 16 of the bearer 22 (Block 58).

Additionally or alternatively, however, the bearer controller 12B may send signalling (not shown) to the sleep controller 12A including information about the activity or inactivity of the bearer 22 at the radio network node 12. The information may for instance indicate that the bearer 22 has been inactive for at least a threshold amount of time, e.g., due to no traffic being transported over the bearer. In this case, the sleep controller 12A may lift the restriction/prevention of sleep modes that were incompatible with QoS requirements 16 of this bearer 22 even before the bearer 22 is released (Block 58). This way, an inactive bearer may not be allowed to prevent or delay the radio network node 12 from entering a sleep mode that would otherwise be deemed incompatible.

Although sleep mode restriction is discussed above in some examples as being performed or updated responsive to bearer setup, release, and/or activity, sleep mode restriction may generally be performed or updated responsive to any condition, criteria, or event, e.g., that is associated with a change in the requirements (e.g., QoS requirements) imposed on the radio network node 12. In some embodiments, for example, sleep mode restriction is performed or updated responsive to the setup, release, and/or activity of any sort of bearer, service, flow, data stream, connection, session etc. that is associated with or indicative of QoS requirements imposed on the radio network node 12. As one example, sleep mode restriction may be performed or updated responsive to the setup, release, and/or activity of a PDU session 40 or QoS flow 46 in FIG. 3. In still other embodiments, sleep mode restriction is performed or updated responsive to mobility events (e.g., handover and/or cell reselection) associated with wireless devices served by the radio network node 12. Indeed, such mobility events inherently affect QoS requirements imposed on the radio network node 12, e.g., as the mobility of served wireless devices changes which bearers, if any, are set up at the radio network node 12.

Figure 6:
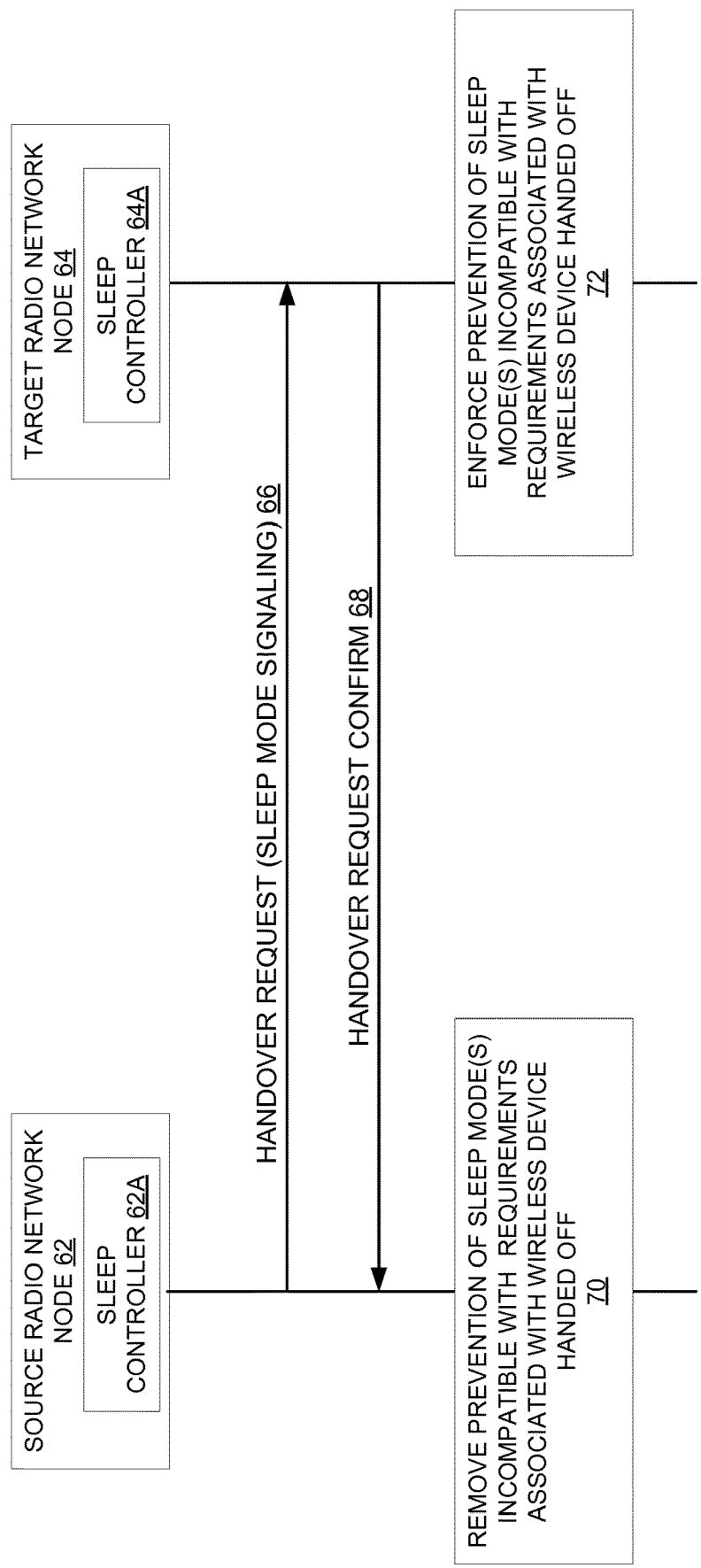
FIG. 6 is a call flow diagram between source and target radio network nodes according to some embodiments.

FIG. 6 illustrates one example in this regard with respect to mobility events. As shown, a source radio network node 62 implements a sleep controller 62A and a target radio network node 64 implements a sleep controller 64A. The source radio network node 62 sends a handover request message 66 to the target radio network node 64 requesting handover of a wireless device 14. The target radio network node 64 in turn sends a handover request confirmation message 68 to the source radio network node 62.

In response to confirmation of handover, the sleep controller 62A as shown controls sleep mode operation of the source radio network node 62 to account for handover of the wireless device 14 and the associated "offloading" of requirements (e.g., QoS requirements) attributable to that wireless device 14. For example, the sleep controller 62A may lift or remove any restriction/prevention of sleep mode(s) incompatible with requirements associated with the wireless device 14 handed off (Block 70). If the requirements imposed on the source radio network node 62 attributable to any other wireless devices still served by the source radio network node are less demanding, this may mean that the sleep controller 62A will now allow the source radio network node 62 to operate in one or more additional sleep modes (e.g., deeper sleep modes) that are compatible with the less demanding requirements.

Notably, the handover request message 66 includes or is associated with sleep mode signalling usable by the sleep controller 64A to control the sleep mode operation of the target radio network node 64 as well. In some embodiments, for example, the sleep mode signalling indicates requirements associated with serving the wireless device 14 being handed over. Where the sleep mode signalling indicates the QoS requirements attributable to the wireless device 14 being handed over, for instance, the signalling may indicate a type, identity, or QCI of a bearer with which the source radio network node 62 was serving the wireless device 14.

No matter the particular nature of the sleep mode signalling, the sleep controller 64A may use this signalling to control sleep mode operation of the target radio network node 64. For example, the sleep controller 64A may enforce restriction/prevention of sleep mode(s) incompatible with requirements associated with the wireless device 14 handed off (Block 72). If the requirements imposed on the target radio network node 64 attributable to the wireless device 14 are more demanding than the requirements attributable to any wireless devices the target radio network node 64 was already serving, this may mean that the sleep controller 64A now prevents the target radio network node 64 from operating in one or more additional sleep modes (e.g., deeper sleep modes) that are incompatible with the more demanding requirements.

As this example demonstrates, sleep mode restriction of a radio network node 12 may depend on requirements imposed on the radio network node 12 across multiple wireless devices served by the radio network node 12, multiple bearers set up at the radio network node 12, etc. Indeed, in such embodiments, the sleep mode operation of the radio network node 12 may be device or bearer agnostic based on the sleepable components of the radio network node being commonly used for serving multiple devices or bearers. Accordingly, although illustrated above at times with respect to a single wireless device 14 or a single bearer, a sleep controller 12A herein may perform sleep mode prevention based on or to account for requirements imposed on the radio network node 12 by multiple served wireless devices, multiple bearers set up, etc. Where the requirements are QoS requirements, for instance, the most demanding QoS requirements attributable to the most demanding wireless devices 14 or bearers may dictate which sleep mode(s) the sleep controller 12A prevents operation in. In the context of data latency, the most demanding QoS requirements may be realized for instance as the shortest data latency allowed across multiple served wireless devices, bearers, etc. In some embodiments, though, the devices or bearers that dictate which sleep mode(s) the sleep controller 12A prevents operation in are limited to a subset of the devices or bearers served by the radio network node 12, e.g., including only devices or bearers whose QoS requirements are above a certain threshold so as to only consider relatively higher priority devices or bearers.

Generally, then, some embodiments provide active prevention of hardware sleep modes not compatible with active radio bearers based on radio-bearer setup, radio-bearer release, and/or mobility events. Some embodiments thereby ensure that hardware sleep mode activation does not have any negative impact on delay sensitive services. By preventing deep sleep modes when necessary, some embodiments enable fast activation of the maximum possible hardware sleep mode, thereby reducing the network energy consumption to a minimum without causing any unacceptable performance degradations.

Consider now an example in FIGS. 7A-7B comparing sleep mode operation with and without sleep mode prevention. As shown in FIG. 7A, without sleep mode prevention, a radio network node may operate in a deep sleep mode until data arrives at the radio network node for transmission. After the data arrives, the radio network node transitions to an active mode to transmit the data, but that transition takes time and delays transmission of the data for a delay D1 shown in FIG. 7A. By contrast, with sleep mode prevention shown in FIG. 7B, a sleep controller prevents the radio network node from operating in the deep sleep mode upon set up of a bearer (or the occurrence of a mobility event) associated with requirements (e.g., QoS requirements such as maximum allowable data latency) for which the deep sleep mode is incompatible. In doing so, the sleep controller effectively controls the radio network node to transition to a light sleep mode. This transition takes less time than transitioning to active mode and only causes a delay of D2. Notably, though, the transition is started and/or finished even before data has arrived at the radio network node for transmission (e.g., over the newly set up bearer). Accordingly, when the data does arrive, the radio network node transitions from the light sleep mode to the active mode to transmit the data, which takes only a short delay D3. In this way, sleep mode prevention advantageously reduces the latency to transmit the data to the point where QoS requirements are met, while allowing the radio network node to operate in a deep sleep mode for as long as possible without jeopardizing those QoS requirements.

This example shows only two sleep modes, including a light sleep mode having a fast activation time and moderate power savings and a deep sleep mode having a longer activation time and significant power saving. But embodiments herein are equally extendable to any number of sleep modes at the radio network node, e.g., with increasing activation times and energy savings.

Further note that the example only considers a scenario where a radio network node needs to transmit data in the downlink. In this case, the sleep modes may be associated with transmission-related hardware of the radio network node. Other embodiments herein are extendable to a scenario where the radio network node needs to receive data in the uplink. In such a case, the sleep modes may instead be associated with reception-related hardware. Different reception-related sleep modes may for instance active receiver hardware to different degrees. For example, the receiver hardware may be active only during random access occasions in a deep sleep mode and it may be constantly active during a lighter sleep mode. As these examples demonstrate, then, sleep modes of the radio network node 12 may relate to different activity levels of transmission circuitry, reception circuitry, circuitry for cells served by the radio network node, circuitry for carriers provided by the radio network node, circuitry for radio access technologies (RATs) provided by the radio network node, or the like.

Moreover, configuration of different sleep modes in a radio network node may have different activation times for receiver and transmitter circuits. When determining a maximum sleep mode that is compatible with the QoS requirements of a service, the sleep controller 12A may take protocol aspects into account. If, for example, a certain service will always start with an uplink transmission followed by a downlink transmission, the sleep controller 12A may choose a sleep mode in which receiver hardware can become active quicker than the transmission hardware (or vice versa).

Also note that the sleep controller 12A in some embodiments may deem the radio network node 12 able to awaken from at least one sleep mode in time to meet certain requirements, based on another radio network node temporarily meeting the requirements on behalf of the radio network node while the radio network node awakens from that sleep mode. In this way, the other radio network node effectively allows the radio network node 12 to stay in a deeper sleep mode than otherwise possible, yet still ensure the requirements are met collectively by the radio network nodes in cooperation. In some embodiments, this assistance by another radio network node is inherently accounted for in predefined wake-up times of the radio network node's sleep modes, e.g., so as to be transparent to the sleep controller 12A.

In other embodiments, though, the sleep controller 12A intelligently determines or calculates the wake-up times for at least some sleep modes based on knowledge about whether another radio network node will temporarily meet requirements on behalf of the radio network node 12. In this case, associated signalling between the sleep controller 12A and the another radio network node may support the sleep controller's wake-up time determination. In some embodiments, for example, the sleep controller 12A signals a request to another radio network node requesting temporary assistance with meeting the requirements and adjusts sleep mode wake-up times based on a response to the request.

In any event, such embodiments effectively implement load-balancing between radio network nodes in order to "mask" the actual wake-up delay of some sleep modes and thereby realize deeper sleep modes. Although described generally with respect to radio network nodes, other embodiments herein may implement load-balancing between any sort of radio network resources, including radio network nodes, cells, carriers, bandwidth parts, network nodes, etc.

As one example, a macro cell may serve (e.g., high priority) traffic temporarily while a radio network node 12 providing a high-capacity cell awakens from a (deep) sleep mode that would not have otherwise been compatible with the QoS requirements of that traffic. As another example, a narrowband carrier (or bandwidth part) may serve (e.g., delay-sensitive) traffic temporarily while a radio network node providing a wideband carrier (or bandwidth part) awakens from a deep sleep mode that would not have otherwise been compatible with the QoS requirements of that traffic. As still another example, a neighboring cell with a higher path loss to a wireless device may handle (e.g., delay-sensitive) traffic temporarily while a radio network node with a lower path loss to the wireless device awakens from a deep sleep mode that would not have otherwise been compatible with the QoS requirements of that traffic. As a final example, a less-suitable RAT (e.g., LTE) may handle (e.g., delay-sensitive) traffic temporarily while a radio network node providing a more suitable RAT (e.g., NR) awakens from a deep sleep mode that would not have otherwise been compatible with the QoS requirements of that traffic.

In these and other examples, though, some embodiments condition assistance from another radio network node, cell, carrier, RAT, etc. on the other radio network node, cell, carrier, or RAT already having the requirements imposed on it, e.g., on the other radio network node, cell, carrier, or RAT already having to serve high priority bearers, low-latency traffic, or delay-sensitive traffic.

Figure 8:
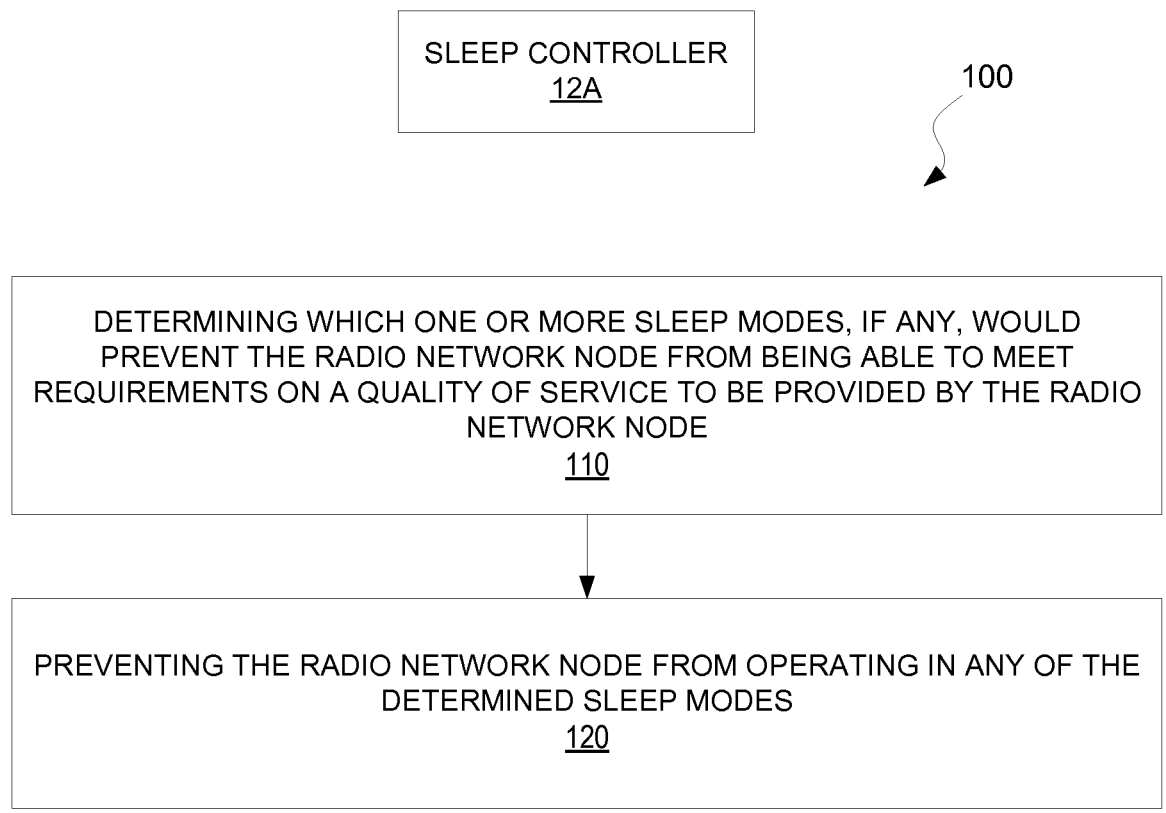
FIG. 8 is a logic flow diagram of a method performed by a sleep controller according to some embodiments.

In view of the above modifications and variations, FIG. 8 illustrates a method 100 performed by a sleep controller 12A for controlling sleep operation of a radio network node 12 according to some embodiments. The method 100 as shown includes determining which one or more sleep modes, if any, would prevent the radio network node 12 from being able to meet requirements on a quality of service to be provided by the radio network node 12 (Block 110). This determination may for instance comprise determining which one or more of the supported sleep modes, if any, the radio network node 12 would not be able to awaken from in time to meet the requirements on a quality of service to be provided by the radio network node 12. Alternatively or additionally, the requirements may for instance comprise a maximum allowable data latency. Regardless of the nature of the requirements, this in some embodiments may involve obtaining or determining the requirements (e.g., a latency requirement associated with a radio bearer) and then determining which sleep modes, if any, are incompatible (or compatible) with the requirements. Regardless, the method 100 as shown further comprises preventing the radio network node 12 from operating in any of the determined sleep modes (Block 120).

In some embodiments, such prevention is temporary or otherwise confined in time to while the requirements are imposed on the radio network node 12. For example, the method may comprise preventing the radio network node 12 from operating in any of the determined sleep modes while the requirements are imposed on the radio network node 12 and allowing the radio network node 12 to operate in at least some of the determined sleep modes while the requirements are not imposed on the radio network node 12. In these and other embodiments, for example, the determination and prevention in method 100 may be performed responsive to a change in the requirements on the quality of service to be provided by the radio network node. Such change may for instance comprise or occur with a change in which bearers, if any, are set up at the radio network node 12 and/or may comprise or occur with mobility events associated with wireless devices served by the radio network node 12.

Figure 9:
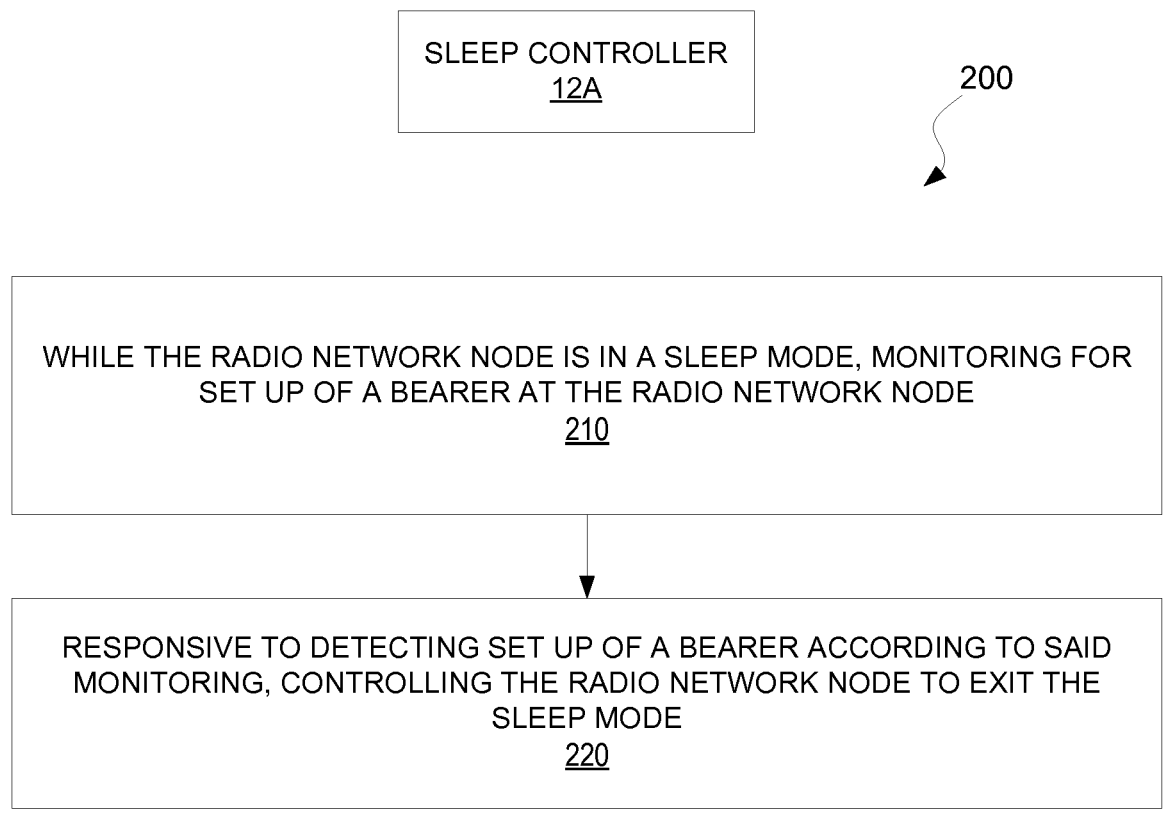
FIG. 9 is a logic flow diagram of a method performed by a sleep controller according to other embodiments.

FIG. 9 illustrates another method 200 performed by a sleep controller 12A according to other embodiments that may be implemented in combination with or independently of the method 100 in FIG. 8. As shown, the method 200 comprises, while the radio network node 12 is in a sleep mode, monitoring for set up of a bearer at the radio network node 12 (Block 210). The method 200 further includes, responsive to detecting set up of a bearer according to said monitoring, controlling the radio network node 12 to exit the sleep mode (Block 220).

In some embodiments, for example, the sleep mode is a deep sleep mode, with the radio network node in a deeper sleep in the deep sleep mode than in a light sleep mode. In this case, the method 200 may comprise, responsive to detecting set up of a bearer according to said monitoring, controlling the radio network node 12 to exit the deep sleep mode and to start to transition to the light sleep mode or an active mode before traffic arrives in a transmit queue of the radio network node 12 for transmission over the bearer. According to these embodiments, then, the sleep controller 12A controls the radio network node 12 to exit the deep sleep mode in advance of traffic arrival, in order to proactively prepare for that traffic and reduce the latency in later transmitting the traffic.

Note that the sleep controller 12A herein may be implemented by any network node in the system 10, such as the radio network node 12 whose sleep operation is controlled or another node in the radio access network. Implementing the sleep controller 12A, such a network node may perform the methods herein and any other processing by implementing any functional means, modules, units, or circuitry. In one embodiment, for example, the network node comprises respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 10A:
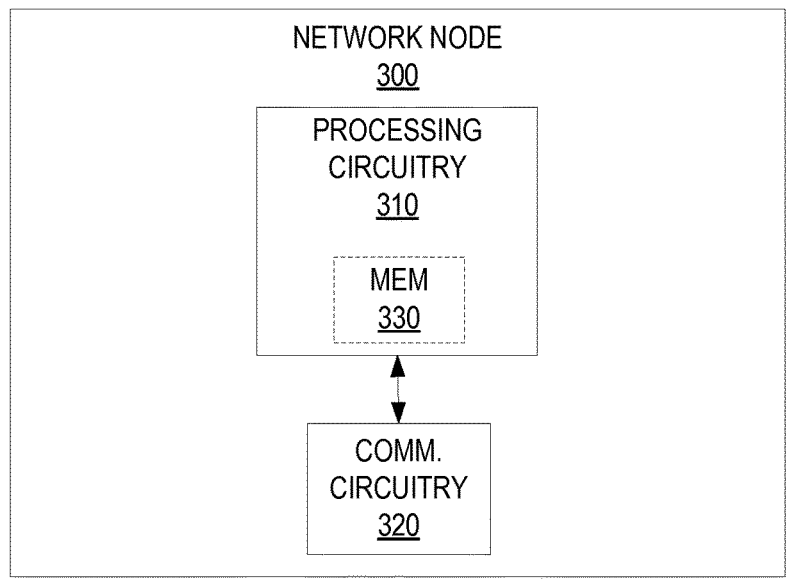
FIG. 10A is a block diagram of a network node configured to implement a sleep controller for controlling sleep operation of a radio network node according to some embodiments.

FIG. 10A for example illustrates a network node 300 in accordance with one or more embodiments for implementing a sleep controller 12A. As shown, the network node 300 includes processing circuitry 310 and communication circuitry 320. The communication circuitry 320 (e.g., radio circuitry) is configured to transmit and/or receive information to and/or from one or more other nodes, e.g., via any communication technology. Such communication may occur via one or more antennas that are either internal or external to the network node 300. The processing circuitry 310 is configured to perform processing described above (e.g., in FIGS. 8 and/or 9), such as by executing instructions stored in memory 330. The processing circuitry 310 in this regard may implement certain functional means, units, or modules.

Figure 10B:
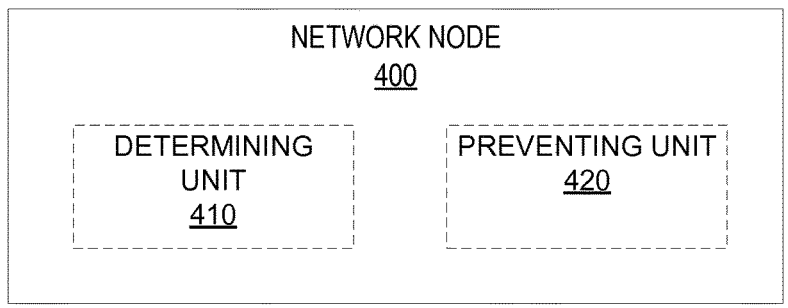
FIG. 10B is a block diagram of a network node configured to implement a sleep controller for controlling sleep operation of a radio network node according to other embodiments

FIG. 10B illustrates a schematic block diagram of a network node 400 according to still other for implementing a sleep controller 12A. As shown, the network node 400 implements various functional means, units, or modules, e.g., via the processing circuitry 310 in FIG. 10A and/or via software code. These functional means, units, or modules, e.g., for implementing the method 100 herein, include for instance a determining unit or module 410 for determining which one or more sleep modes, if any, would prevent a radio network node 12 from being able to meet requirements on a quality of service to be provided by the radio network node 12. Also included is a preventing unit or module 420 for preventing the radio network node 12 from operating in any of the determined sleep modes.

Figure 10C:
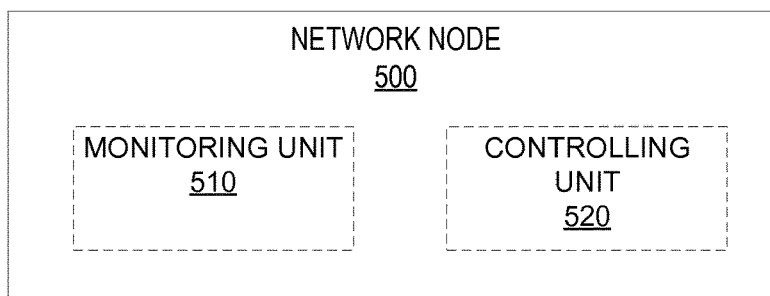
FIG. 10C is a block diagram of a network node configured to implement a sleep controller for controlling sleep operation of a radio network node according to still other embodiments.

FIG. 10C illustrates a schematic block diagram of a network node 500 according to still other for implementing a sleep controller 12A. As shown, the network node 500 implements various functional means, units, or modules, e.g., via the processing circuitry 310 in FIG. 10A and/or via software code. These functional means, units, or modules, e.g., for implementing the method 200 herein, include for instance a monitoring unit or module 510 for, while a radio network node 12 is in a sleep mode, monitoring for set up of a bearer at the radio network node 12. Also included is a controlling unit or module 520 for, responsive to detecting set up of a bearer according to said monitoring, controlling the radio network node 12 to exit the sleep mode.

Those skilled in the art will also appreciate that embodiments herein further include corresponding computer programs.

A computer program comprises instructions which, when executed on at least one processor of a network node configured to implement a sleep controller 12A for controlling sleep operation of a radio network node 12, cause the sleep controller 12A to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of a network node configured to implement a sleep controller 12A for controlling sleep operation of a radio network node 12, cause the sleep controller 12A to perform as described above.

Embodiments further include a computer program product comprising program code portions for performing the steps of any of the embodiments herein when the computer program product is executed by a computing device. This computer program product may be stored on a computer readable recording medium.

Figure 11:
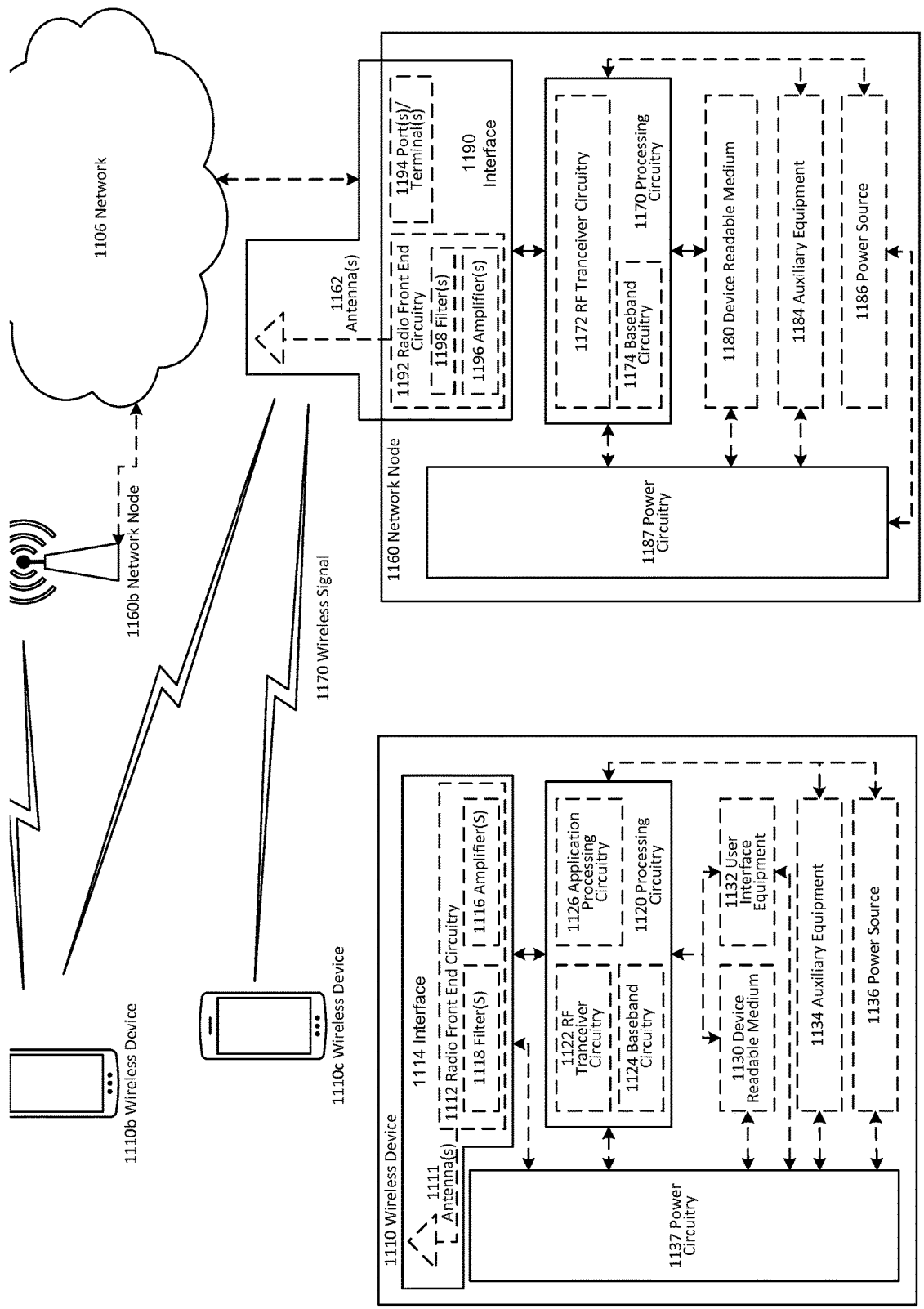
FIG. 11 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network 1106, network nodes 1160 and 1160b, and WDs 1110, 1110b, and 1110c. In practice, a wireless network may further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SOC).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signalling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196. Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170. In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 11 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V21), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1110.

Antenna 1111 may include one or more antennas or antenna arrays, configured to send and/or receive wireless signals, and is connected to interface 1114. In certain alternative embodiments, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WD. Any information, data and/or signals may be received from a network node and/or another WD. In some embodiments, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and is configured to condition signals communicated between antenna 1111 and processing circuitry 1120. Radio front end circuitry 1112 may be coupled to or a part of antenna 1111. In some embodiments, WD 1110 may not include separate radio front end circuitry 1112; rather, processing circuitry 1120 may comprise radio front end circuitry and may be connected to antenna 1111. Similarly, in some embodiments, some or all of RF transceiver circuitry 1122 may be considered a part of interface 1114. Radio front end circuitry 1112 may receive digital data that is to be sent out to other network nodes or WDs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other embodiments, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry may comprise different components and/or different combinations of components. In certain embodiments processing circuitry 1120 of WD 1110 may comprise a SOC. In some embodiments, RF transceiver circuitry 1122, baseband processing circuitry 1124, and application processing circuitry 1126 may be on separate chips or sets of chips. In alternative embodiments, part or all of baseband processing circuitry 1124 and application processing circuitry 1126 may be combined into one chip or set of chips, and RF transceiver circuitry 1122 may be on a separate chip or set of chips. In still alternative embodiments, part or all of RF transceiver circuitry 1122 and baseband processing circuitry 1124 may be on the same chip or set of chips, and application processing circuitry 1126 may be on a separate chip or set of chips. In yet other alternative embodiments, part or all of RF transceiver circuitry 1122, baseband processing circuitry 1124, and application processing circuitry 1126 may be combined in the same chip or set of chips. In some embodiments, RF transceiver circuitry 1122 may be a part of interface 1114. RF transceiver circuitry 1122 may condition RF signals for processing circuitry 1120.

In certain embodiments, some or all of the functionality described herein as being performed by a WD may be provided by processing circuitry 1120 executing instructions stored on device readable medium 1130, which in certain embodiments may be a computer-readable storage medium. In alternative embodiments, some or all of the functionality may be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WD. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some embodiments, processing circuitry 1120 and device readable medium 1130 may be considered to be integrated.

User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected). User interface equipment 1132 may include input interfaces, devices and circuits, and output interfaces, devices and circuits. User interface equipment 1132 is configured to allow input of information into WD 1110, and is connected to processing circuitry 1120 to allow processing circuitry 1120 to process the input information. User interface equipment 1132 may include, for example, a microphone, a proximity or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network, and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc. The inclusion and type of components of auxiliary equipment 1134 may vary depending on the embodiment and/or scenario.

Power source 1136 may, in some embodiments, be in the form of a battery or battery pack. Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain embodiments comprise power management circuitry. Power circuitry 1137 may additionally or alternatively be operable to receive power from an external power source; in which case WD 1110 may be connectable to the external power source (such as an electricity outlet) via input circuitry or an interface such as an electrical power cable. Power circuitry 1137 may also in certain embodiments be operable to deliver power from an external power source to power source 1136. This may be, for example, for the charging of power source 1136. Power circuitry 1137 may perform any formatting, converting, or other modification to the power from power source 1136 to make the power suitable for the respective components of WD 1110 to which power is supplied.

Figure 12:
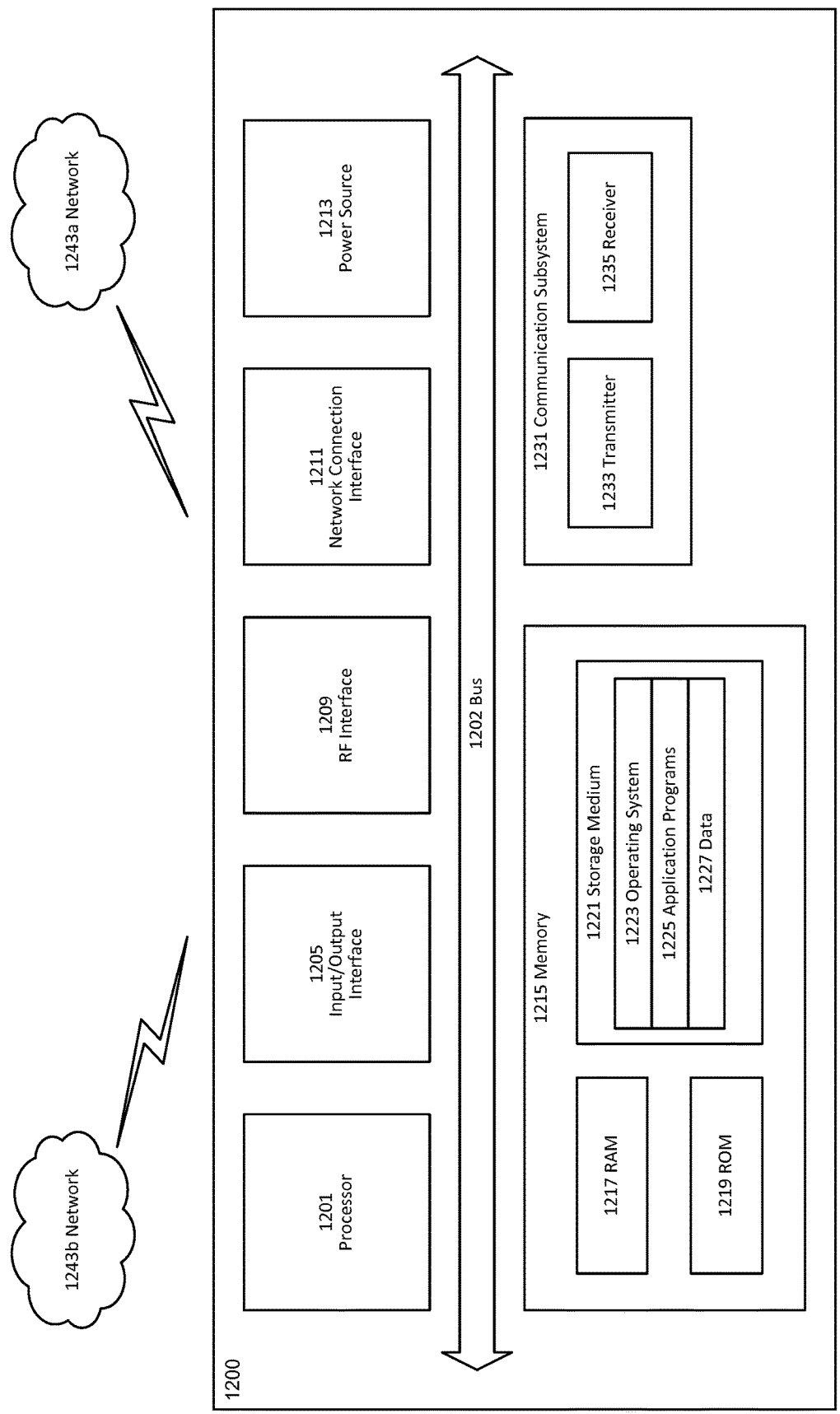
FIG. 12 is a block diagram of a user equipment according to some embodiments.

FIG. 12 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 12200 may be any UE identified by the 3rd Generation Partnership Project (3GPP), including a NB-IoT UE, a machine type communication (MTC) UE, and/or an enhanced MTC (eMTC) UE. UE 1200, as illustrated in FIG. 12, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 12 is a UE, the components discussed herein are equally applicable to a WD, and vice-versa.

In FIG. 12, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs). Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface 1209 may be configured to provide a communication interface to RF components such as a transmitter, a receiver, and an antenna. Network connection interface 1211 may be configured to provide a communication interface to network 1243a. Network 1243a may encompass wired and/or wireless networks such as a local-area network (LAN), a wide-area network (WAN), a computer network, a wireless network, a telecommunications network, another like network or any combination thereof. For example, network 1243a may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211 may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 12, processing circuitry 1201 may be configured to communicate with network 1243b using communication subsystem 1231. Network 1243a and network 1243b may be the same network or networks or different network or networks. Communication subsystem 1231 may be configured to include one or more transceivers used to communicate with network 1243b. For example, communication subsystem 1231 may be configured to include one or more transceivers used to communicate with one or more remote transceivers of another device capable of wireless communication such as another WD, UE, or base station of a radio access network (RAN) according to one or more communication protocols, such as IEEE 802.12, CDMA, WCDMA, GSM, LTE, UTRAN, WiMax, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243b may encompass wired and/or wireless networks such as a local-area network (LAN), a wide-area network (WAN), a computer network, a wireless network, a telecommunications network, another like network or any combination thereof. For example, network 1243b may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Figure 13:
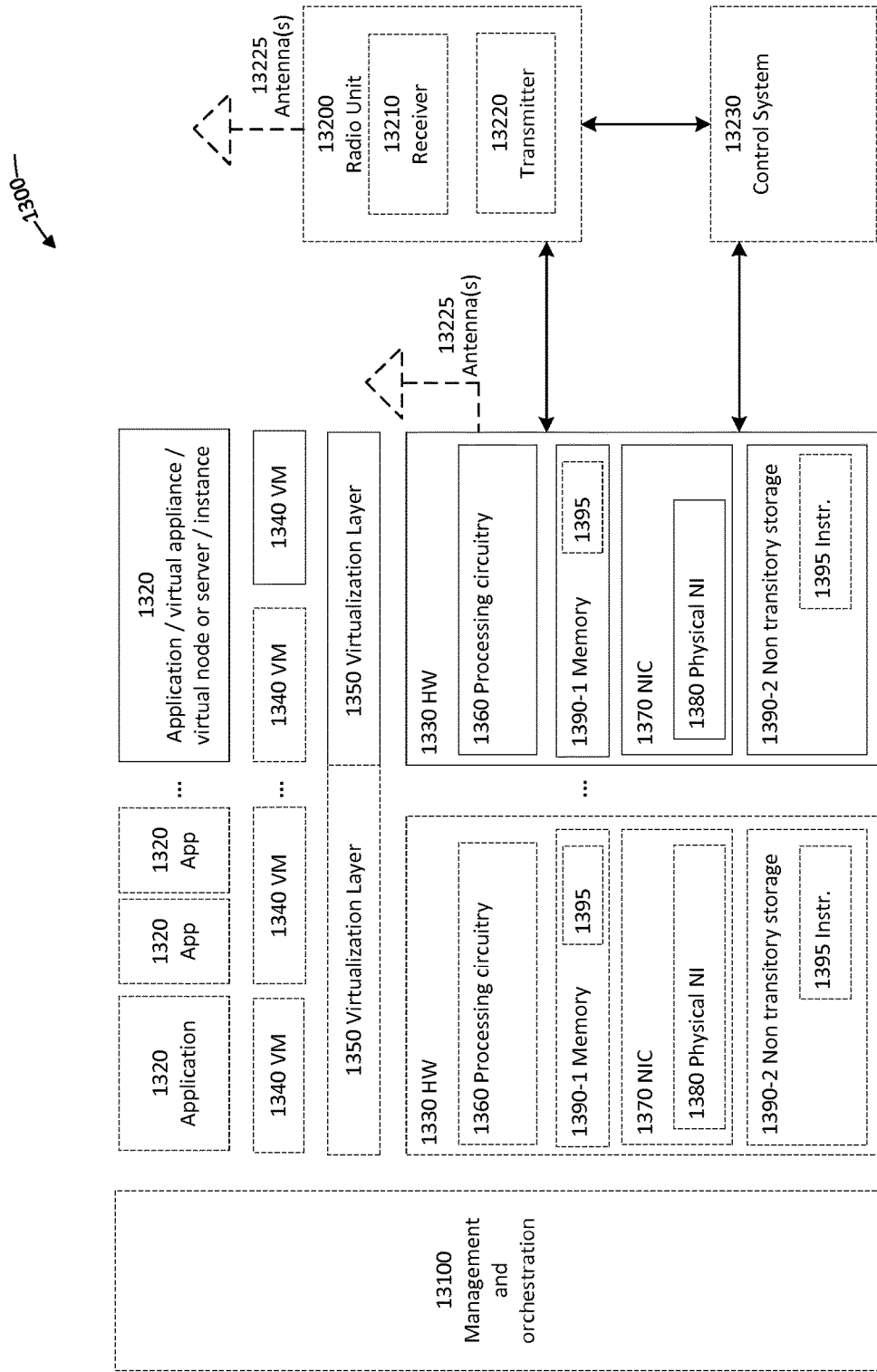
FIG. 13 is a block diagram of a virtualization environment according to some embodiments.

FIG. 13 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 13, hardware 1330 may be a standalone network node with generic or specific components. Hardware 1330 may comprise antenna 13225 and may implement some functions via virtualization. Alternatively, hardware 1330 may be part of a larger cluster of hardware (e.g. such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 13.

In some embodiments, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio access node or a base station.

In some embodiments, some signalling can be effected with the use of control system 13230 which may alternatively be used for communication between the hardware nodes 1330 and radio units 13200.

Figure 14:
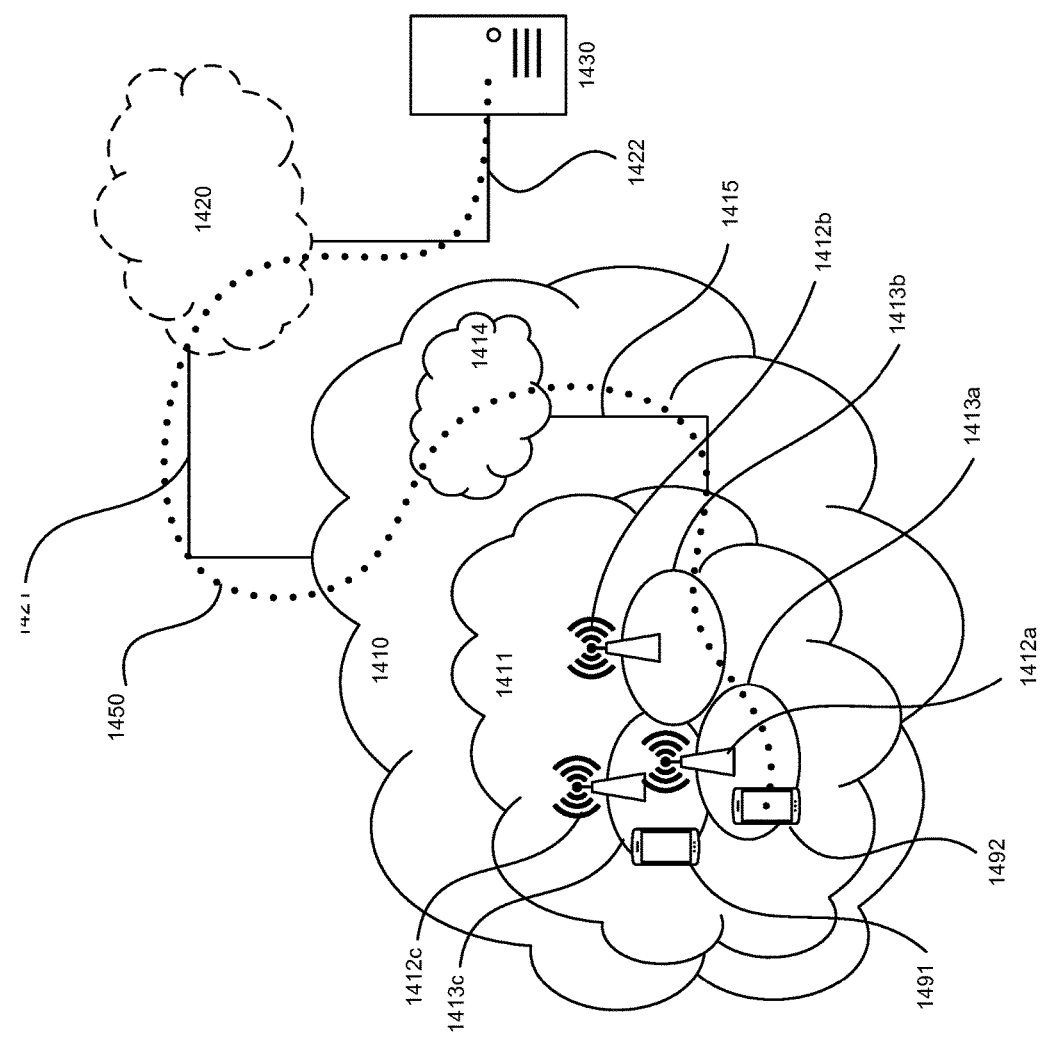
FIG. 14 is a block diagram of a communication network with a host computer according to some embodiments.

FIG. 14 illustrates a telecommunication network connected via an intermediate network to a host computer in accordance with some embodiments. In particular, with reference to FIG. 14, in accordance with an embodiment, a communication system includes telecommunication network 1410, such as a 3GPP-type cellular network, which comprises access network 1411, such as a radio access network, and core network 1414. Access network 1411 comprises a plurality of base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to core network 1414 over a wired or wireless connection 1415. A first UE 1491 located in coverage area 1413c is configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 14 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Figure 15:
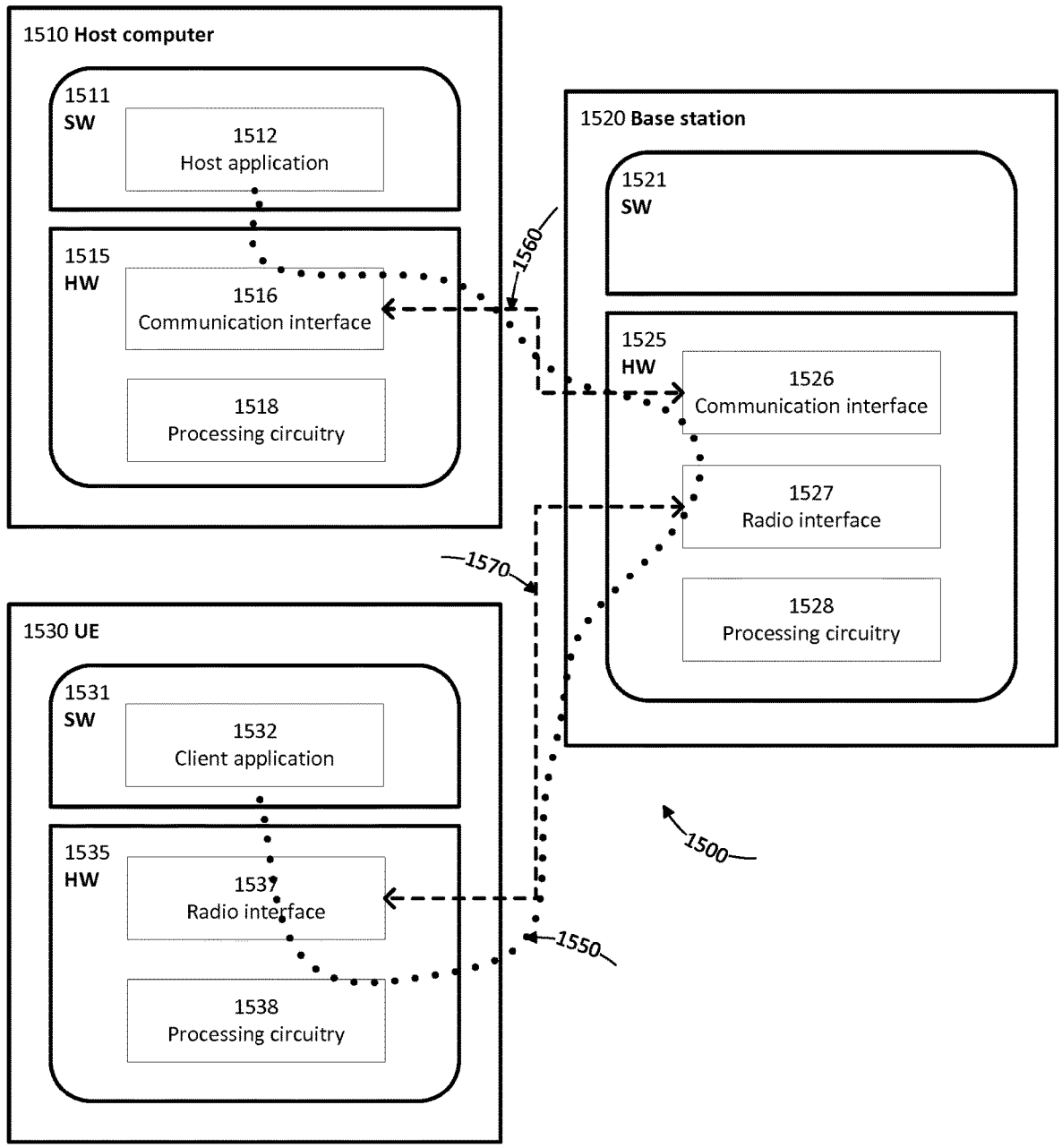
FIG. 15 is a block diagram of a host computer according to some embodiments.

Example implementations, in accordance with an embodiment, of the UE, base station and host computer discussed in the preceding paragraphs will now be described with reference to FIG. 15. FIG. 15 illustrates host computer communicating via a base station with a user equipment over a partially wireless connection in accordance with some embodiments In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 15) served by base station 1520. Communication interface 1526 may be configured to facilitate connection 1560 to host computer 1510. Connection 1560 may be direct or it may pass through a core network (not shown in FIG. 15) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 15 may be similar or identical to host computer 1430, one of base stations 1412a, 1412b, 1412c and one of UEs 1491, 1492 of FIG. 14, respectively. This is to say, the inner workings of these entities may be as shown in FIG. 15 and independently, the surrounding network topology may be that of FIG. 14.

In FIG. 15, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the teachings of these embodiments may improve the data latency and power consumption and thereby provide benefits such as reduced user waiting time, better responsiveness, and reduced environmental footprint.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figure 16:
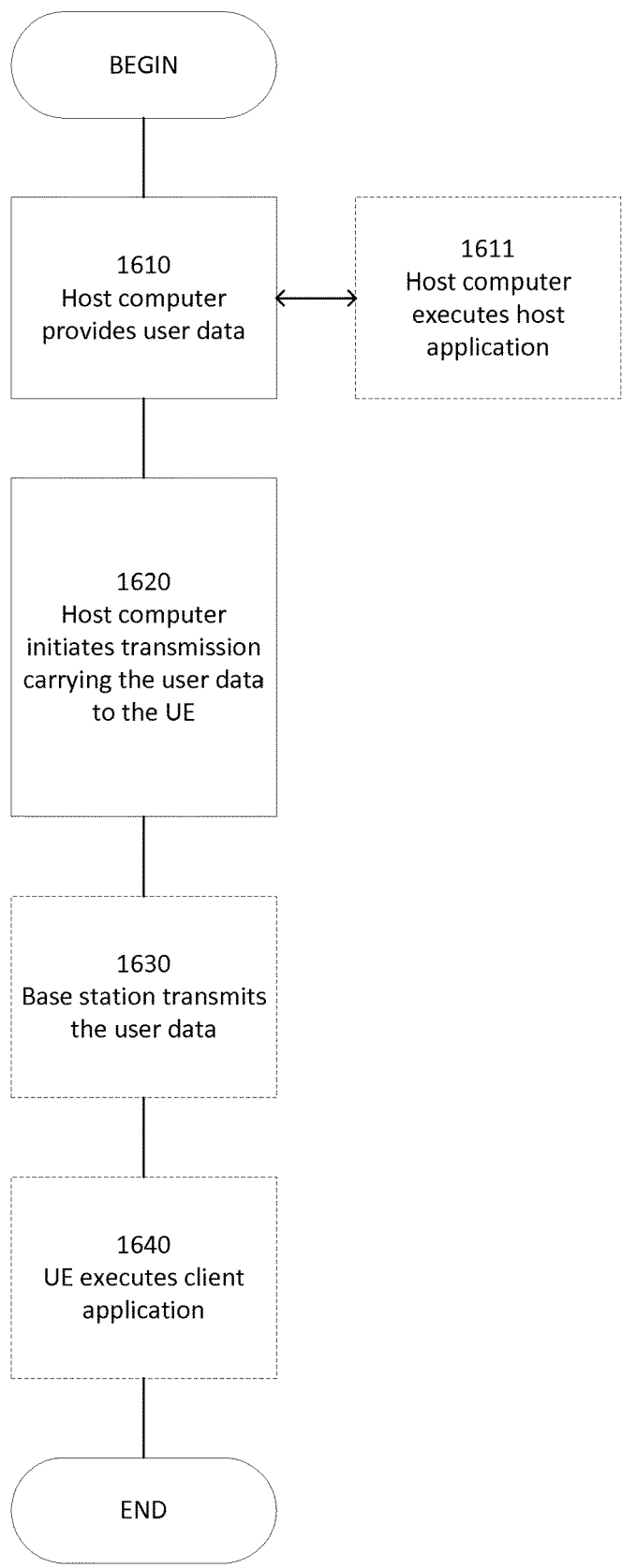
FIG. 16 is a flowchart illustrating a method implemented in a communication system, in accordance with one embodiment.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 17:
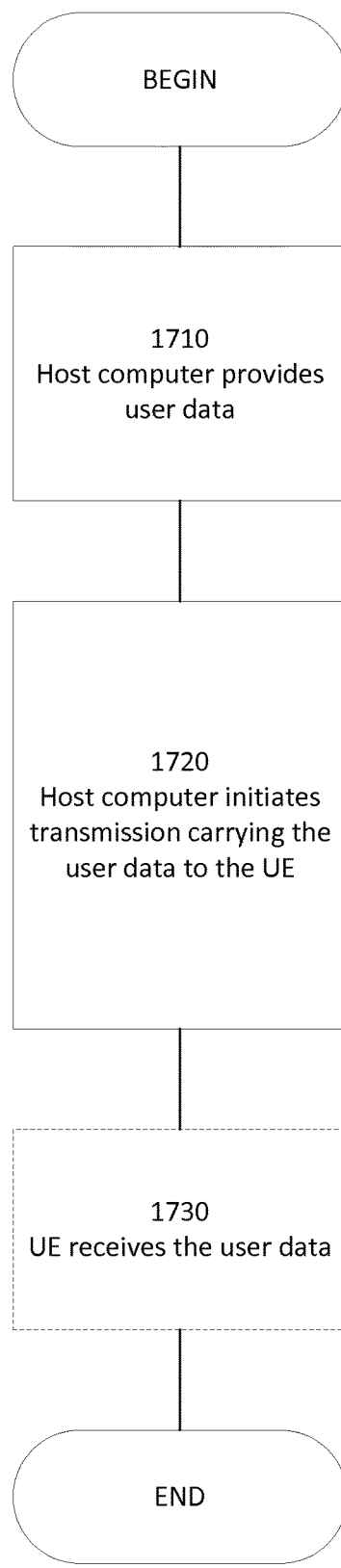
FIG. 17 is a flowchart illustrating a method implemented in a communication system, in accordance with one embodiment.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figure 18:
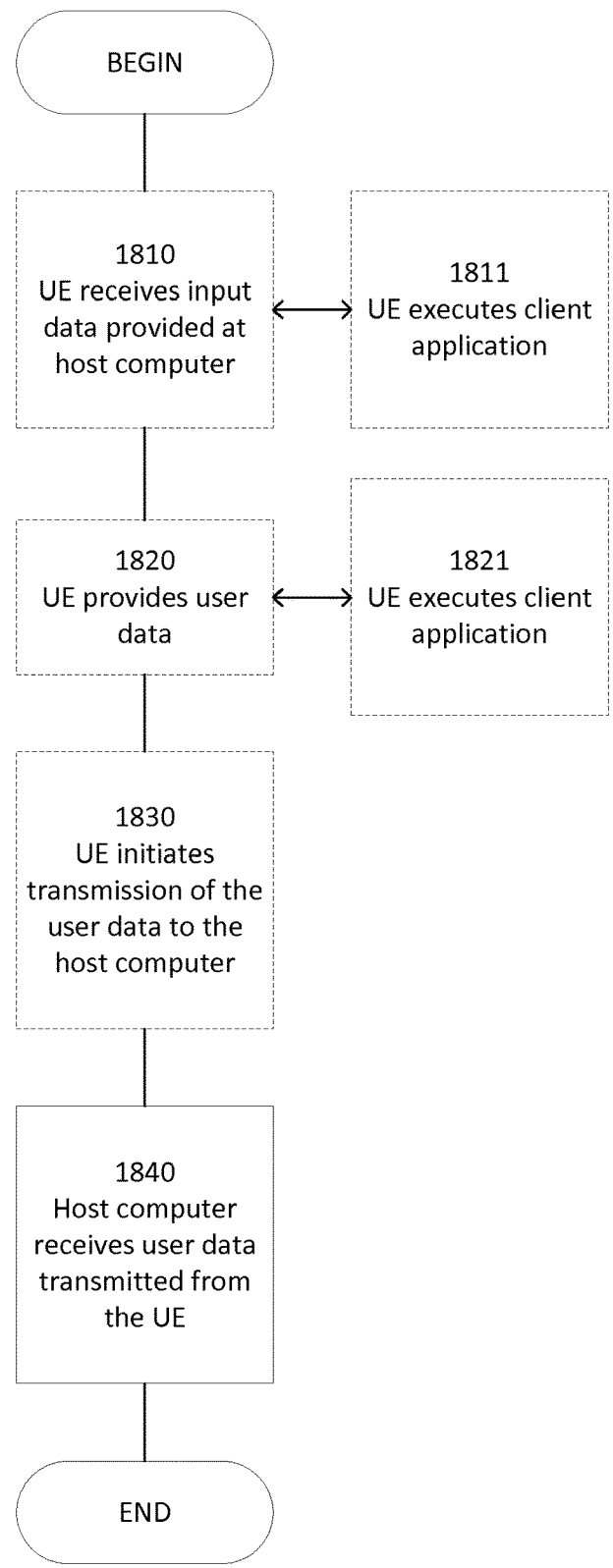
FIG. 18 is a flowchart illustrating a method implemented in a communication system, in accordance with one embodiment.

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

Figure 19:
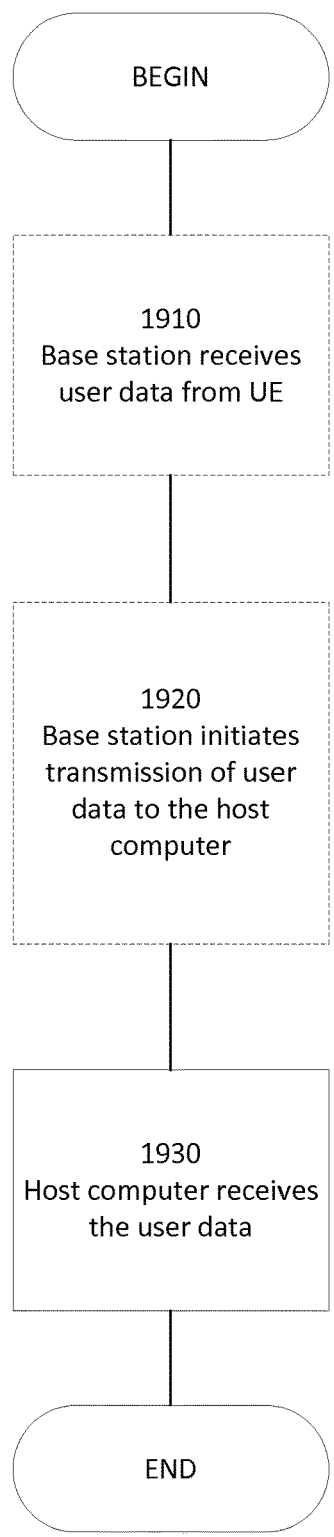
FIG. 19 is a flowchart illustrating a method implemented in a communication system, in accordance with one embodiment.

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method for controlling sleep operation of a radio network node that supports multiple sleep modes, the method comprising:
   responsive to a change in at least one requirement on a quality of service to be provided by the radio network node, determining a subset of one or more sleep modes, out of the multiple supported sleep modes, from which the radio network node would not be able to awaken in time to meet requirements on a quality of service to be provided by the radio network node; and
   responsive to a change in at least one requirement on a quality of service to be provided by the radio network node, preventing the radio network node from operating in any sleep mode included in the determined subset while the at least one requirement is imposed on the radio network node and allow the radio network node to operate in at least one sleep mode included in the determined subset while the at least one requirement is not imposed on the radio network node.

2. The method of claim 1, wherein the requirements on a quality of service to be provided by the radio network node comprises a maximum allowable data latency.

3. The method of claim 1, wherein said change comprises or occurs with a change in which bearers, if any, are set up at the radio network node.

4. The method of claim 1, wherein said change comprises or occurs with mobility events associated with wireless devices served by the radio network node.

5. The method of claim 1, wherein the requirements are associated with one or more bearers and are imposed on the radio network node while the one or more bearers are set up and/or active at the radio network node.

6. The method of claim 1, wherein said determining comprises determining which of the multiple supported sleep modes are mapped to one or more quality of service (QoS) class identifiers of one or more bearers set up at the radio network node as being incompatible with those one or more QoS class identifiers, and wherein said preventing comprises preventing the radio network node from operating in any of the corresponding bearers.

7. The method of claim 1, further comprising operating in a sleep mode from which the radio network node is able to be awaken from in time to meet the requirements, based on the radio network node being supported by another radio network node while the radio network node awakens from that sleep mode.

8. A network node for controlling sleep operation of a radio network node that supports multiple sleep modes, the network node comprising radio circuitry and processing circuitry wherein the network node is configured to:
   responsive to a change in at least one requirement on a quality of service to be provided by the radio network node, determine a subset of one or more sleep modes, out of the multiple supported sleep modes, from which the radio network node would not be able to awaken in time to meet requirements on a quality of service to be provided by the radio network node; and
   responsive to a change in at least one requirement on a quality of service to be provided by the radio network node, prevent the radio network node from operating in any sleep mode included in the determined subset while the at least one requirement is imposed on the radio network node and allow the radio network node to operate in at least one sleep mode included in the determined subset while the at least one requirement is not imposed on the radio network node.

9. The network node of claim 8, wherein the requirements on a quality of service to be provided by the radio network node comprises a maximum allowable data latency.

10. The network node of claim 8, wherein said change comprises or occurs with a change in which bearers, if any, are set up at the radio network node.

11. The network node of claim 8, wherein said change comprises or occurs with mobility events associated with wireless devices served by the radio network node.

12. The network node of claim 8, wherein the requirements are associated with one or more bearers and are imposed on the radio network node while the one or more bearers are set up and/or active at the radio network node.

13. The network node of claim 8, the network node comprising radio circuitry and processing circuitry wherein the network node is configured to determine the subset by determining which of the multiple supported sleep modes are mapped to one or more quality of service (QoS) class identifiers of one or more bearers set up at the radio network node as being incompatible with those one or more QoS class identifiers, and prevent the radio network node from operating in any of the corresponding bearers.

14. The network node of claim 8, the network node comprising radio circuitry and processing circuitry wherein the network node is configured to operate in a sleep mode from which the radio network node is able to be awaken from in time to meet the requirements, based on the radio network node being supported by another radio network node while the radio network node awakens from that sleep mode.

15. The network node of claim 8, the network node comprising radio circuitry and processing circuitry wherein the network node is configured to transmit or receive a handover request message that requests handover of a wireless device to or from the radio network node and that indicates requirements on a quality of service associated with serving the wireless device.

16. A non-transitory computer-readable storage medium storing instructions that, when executed by at least one processor of a network node for controlling sleep operation of a radio network node that supports multiple sleep modes, causes the network node to:
- responsive to a change in at least one requirement on a quality of service to be provided by the radio network node, determine a subset of one or more sleep modes, out of the multiple supported sleep modes, from which the radio network node would not be able to awaken in time to meet requirements on a quality of service to be provided by the radio network node; and
- responsive to a change in at least one requirement on a quality of service to be provided by the radio network node, prevent the radio network node from operating in any sleep mode included in the determined subset while the at least one requirement is imposed on the radio network node and allow the radio network node to operate in at least one sleep mode included in the determined subset while the at least one requirement is not imposed on the radio network node.

\* \* \* \* \*